(12) United States Patent
Holm

(10) Patent No.: US 6,174,081 B1
(45) Date of Patent: Jan. 16, 2001

(54) SPECULAR REFLECTION OPTICAL BANDGAP THERMOMETRY

(75) Inventor: Ronald T. Holm, Alexandria, VA (US)

(73) Assignee: The United States of America as represented by the Secretary of the Navy, Washington, DC (US)

( * ) Notice: Under 35 U.S.C. 154(b), the term of this patent shall be extended for 0 days.

(21) Appl. No.: 09/016,870

(22) Filed: Jan. 30, 1998

(51) Int. Cl.$^7$ ..................................................... G01K 11/00
(52) U.S. Cl. ............................................................... 374/161
(58) Field of Search .................................... 374/161, 120, 374/131; 356/44, 43, 445; 256/339.04, 341.3, 341.4, 341.8

(56) References Cited

U.S. PATENT DOCUMENTS

| | | | | |
|---|---|---|---|---|
| 4,081,215 | * | 3/1978 | Penney et al. | 374/123 |
| 4,729,668 | * | 3/1988 | Angel et al. | 374/161 |
| 4,890,245 | * | 12/1989 | Yomoto et al. | 374/121 |
| 5,098,199 | * | 3/1992 | Amith | 374/161 |
| 5,167,452 | * | 12/1992 | Amith et al. | 374/161 |
| 5,388,909 | * | 2/1995 | Johnson et al. | 374/161 |
| 5,474,381 | * | 12/1995 | Mosleshi | 374/161 |
| 5,568,978 | * | 10/1996 | Johnson et al. | 374/161 |
| 5,741,070 | * | 4/1998 | Mosleshi | 374/120 |

FOREIGN PATENT DOCUMENTS

0000634 * 1/1984 (JP) ....................................... 374/161

OTHER PUBLICATIONS

Thermionics, Model DRS for in-situ temperature measurement.*

* cited by examiner

Primary Examiner—Peter S. Wong
Assistant Examiner—Pia Tibbits
(74) Attorney, Agent, or Firm—Barry Edelberg; Sally Ferrett

(57) ABSTRACT

A new technique of optical bandgap thermometry allows one to accurately measure the temperature of semiconductor samples by using the temperature dependent reflective properties of the samples. The disclosed technique uses specular reflection at an oblique angle of incidence. Light from a light source such as quartz halogen lamp is chopped and focused by a lens. The light then is focused onto the sample at an oblique angle of incidence. The light is specularly reflected by the sample and is focused by a lens into a spectrometer. The spectrometer is used to determine the spectrum of the light reflected from the sample. The reflectance varies with temperature and the temperature of the sample is calculated as a function of the reflectance spectrum.

28 Claims, 18 Drawing Sheets

SPECULAR REFLECTION OPTICAL BANDGAP THERMOMETRY

BACKGROUND OF THE INVENTION

This invention relates to a method and apparatus for determining the temperature of a sample by measuring the specular reflectance from the sample.

The concept of optical bandgap thermometry is at least twenty five years old. In 1972 H. Wieder in "Novel method for measuring transient surface temperatures with high spatial and temporal resolution," J. Appl. Phys. 43, 3213 (1972) proposed that the temperature of a semiconductor sample could be deduced from the temperature dependence of its own optical bandgap. He developed a technique that he called the laser thermoprobe as he published in "Laser thermoprobe," Opt. Comm. 11, 301 (1974) and in "Thermal-profile measurements with submicrometer resolution," Laser Focus 11, 86 (May, 1975). As the sample temperature changed, he measured the change in the reflected intensity of a laser beam whose energy lay within the range of the absorption edge. Subsequently, it appears that four other groups may have independently suggested the same idea. See D. A. Christensen, "A new non-perturbing temperature probe using semiconductor band edge shift," J. Bioengineering 1, 541 (1977); K. Kyuma, S. Tai, T. Sawada and M. Numoshita, "Fiber-optic instrument for temperature measurement," IEEE J. Quant. Elec. QE-18, 676 (1982); E. S. Hellman and J. S. Harris, Jr., "Infra-red transmission spectroscopy of GaAs during molecular beam epitaxy," J. Crystal Growth 81, 38 (1987); and J. C. Sturm, P. V. Schwartz, and P. M. Garone, "Silicon temperature measurement by infrared transmission for rapid thermal processing applications," Appl. Phys.

Currently there are two major applications of optical bandgap thermometry. One is based on either normal incidence transmission or reflection. The other depends on diffuse reflection from the back side of a sample.

The transmission method was developed to measure wafer temperature in molecular-beam-evaporation thin-film growth systems. See D. Kirillov and R. A. Powell, MIMIC Phase III Contract No. DAALOI-89-C-0907, final report, April 1991 and their U.S. Pat. No. 5,118,200, and M. E. Adel, Y. Ish-Shalom, S. Mangan, D. Cabib, and H. Gilboa, "Noncontact temperature monitoring of semiconductors by optical absorption edge sensing," SPIE 1803, 290 (1992) relating to the transmission method. See also U.S. Pat. No. 4,136,566 to Christensen which appears to correspond to the 1977 Christensen paper and where the detector detects intensity of transmitted radiant energy. The essential elements of the transmission method are depicted in FIG. 1(a). The heater serves a dual purpose: 1) it directly heats the wafer radiatively to the growth temperature and 2) it serves as a built-in light source for the transmission measurement. The light that passes through the wafer is directed to a spectrometer. The spectrometer is scanned over a photon energy substantially range that straddles the bandgap energy.

An illustrative transmission spectrum, which has a sigmoidal line shape, is shown in FIG. 2. For photon energies below the bandgap energy, $E_g$, the transmittance is of the order of 50%. Just below $E_g$, the transmittance abruptly drops to zero. This steep edge is commonly referred to as the bandgap absorption edge.

The bandgap energy depends on sample temperature, decreasing as the sample temperature increases. See C. D. Thrumond, "The standard thermodynamic functions for the formation of electrons and holes in Ge, Si, GaAs, and GaP," J. Electrochem. Soc. 122, 1133 (1975). Thus, the position of the absorption edge shifts to lower energy as the temperature increases as seen in FIG. 8 to be discussed below. The sample temperature can then be inferred from the position of the absorption edge.

The transmission method works well for situations in which the sample temperature is high (>500° C.). The heater is a bright light source because its temperature is high. Film growth on wafers whose temperature is lower than 500° C. requires cooler heaters so that the brightness is too low. One way to remedy this situation is to place an ancillary light source behind the sample. However, in many growth systems this may be technically impractical.

The salient features of the diffuse reflection method have been described by M. K. Weilmeier, K. M. Colbow, T. Tiedje, T. Van Buuren, and L. Xu, "A new optical temperature measurement technique for semiconductor substrates in molecular bean epitaxy," Can. J. Phys. 69, 422 (1991) and by S. R. Johnson, et al., in their U.S. Pat. Nos. 5,568,978 and 5,388,909 and these features are pictured in FIG. 1(b). To enhance the coupling between the heater radiation and the sample, the back surface of the sample is often roughened. Light from a broadband source is directed to the front of the sample. Part of the light crosses the front surface and propagates to the back surface. Part of this light diffusely reflects (i.e., scatters in all directions back into the sample) from the rough surface. The diffusely reflected light is collected in a non-specular direction with a lens and focused into a spectrometer. Diffuse reflection spectra are recorded as in the transmission method and a line shape similar to that in FIG. 2 is obtained.

The diffuse reflection method is another solution to the low light level problem. However, the signal-to-noise ratio is much worse because the intensity of the detected light below $E_g$ is very low. In addition, it is difficult to accurately model the diffuse reflection. The angular dependence and magnitude of the scattering are not known and it is difficult to account for the collection of the rays.

In many situations it is not feasible or desirable to roughen the back surface of the sample. In process chambers, such as plasma etching systems, samples may be attached to holders that can be either heated or cooled. Transmission is not possible and diffuse reflection is not practical because back side is specular.

In a hybrid mode, the Christensen U.S. Pat. No. 4,790,669 relates to optical bandgap thermometry which records a spectrum either by normal-incidence reflection from the sensor or by normal-incidence transmission through the sensor. FIG. 9(b) uses normal-incidence reflection from the thick film backed by a mirror. FIG. 10(b) is similar to FIG. 9(b) except that the effect of the mirror has been replaced by total reflection at the beveled sides of the detector. FIGS. 11 (b) and 12(b) are also similar to FIG. 9(b) except in the manner in which the light is reflected from the back side of the sensor; this may affect the value of the reflectance at photon energies below the bandgap energy. FIG. 13 uses normal-incidence reflectance from a semi-infinite sample, which will not work as a temperature sensor. FIG. 10(a) is basically a transmission configuration and FIG. 14 uses normal-incidence transmittance. There is no focus on using the reflectance of specular light at nonnormal incidence.

SUMMARY OF THE INVENTION

Accordingly, it is an object of this invention to provide a process for determining a semiconducting sample's temperature by measuring its specular reflectance.

It is a further object of this invention to use specular reflection optical bandgap thermometry to measure sample temperatures for samples where transmission is not possible.

It is a further object of this invention to use specular reflection optical bandgap thermometry to measure sample temperatures for samples where the temperature is lower than 500° C. so that transmission is not possible.

It is a further object of this invention to use specular reflection optical bandgap thermometry to measure sample temperatures for samples where it is not feasible or desirable to roughen the back surface of the sample for the diffuse reflection method.

It is a further object of this invention to use specular reflection optical bandgap thermometry to measure sample temperatures for samples where diffuse reflection is not possible because the backside is specular.

It is a further object of this invention to use specular reflection optical bandgap thermometry to measure sample temperatures over a very wide temperature range with signal-to-noise ratios comparable to or better than those in the transmission method.

It is a further object of this invention to use specular reflection optical bandgap thermometry to measure sample temperatures using the inflection point on the absorption edge as a significant marker.

It is a further object of this invention to use specular reflection optical bandgap thermometry to measure sample temperatures using a high-energy knee as a significant marker.

It is a further object of this invention to use specular reflection optical bandgap thermometry to measure sample temperatures by applying the light at the Brewster's angle.

These and further objects of the invention will become apparent as the description of the invention proceeds.

By using a new process of specular reflection optical bandgap thermometry, sample temperatures can be accurately measured over a very wide temperature range with signal-to-noise ratios comparable to or better than those in the transmission optical bandgap thermometry method. The process uses the temperature dependent reflective properties of the semiconductor samples. This technique is based upon the semiconductor extinction coefficients increasing abruptly as the photon energy varies from below the optical bandgap to above and on the bandgap exhibiting a strong temperature dependence. The process uses specular reflection at an oblique angle of incidence. In a preferred embodiment light from a light source such as a quartz halogen lamp is chopped and focused by a lens onto the sample at an oblique angle of incidence. The light is specularly reflected by the sample and is focused by a lens into a spectrometer. At some point in the light path the light passes through a monochromator. The spectrometer is used to determine the spectrum of the light reflected from the sample. The reflectance varies with temperature and the temperature of the sample is calculated as a function of the reflectance spectrum. When the light is p-polarized and the angle of incidence is at Brewster's angle, the dynamic range and signal-to-noise ratio are greater than those of either the transmission method or the diffuse-reflection method. In addition, the physical interpretation is particularly simple.

DESCRIPTION OF THE PREFERRED EMBODIMENTS

Figure 1A:
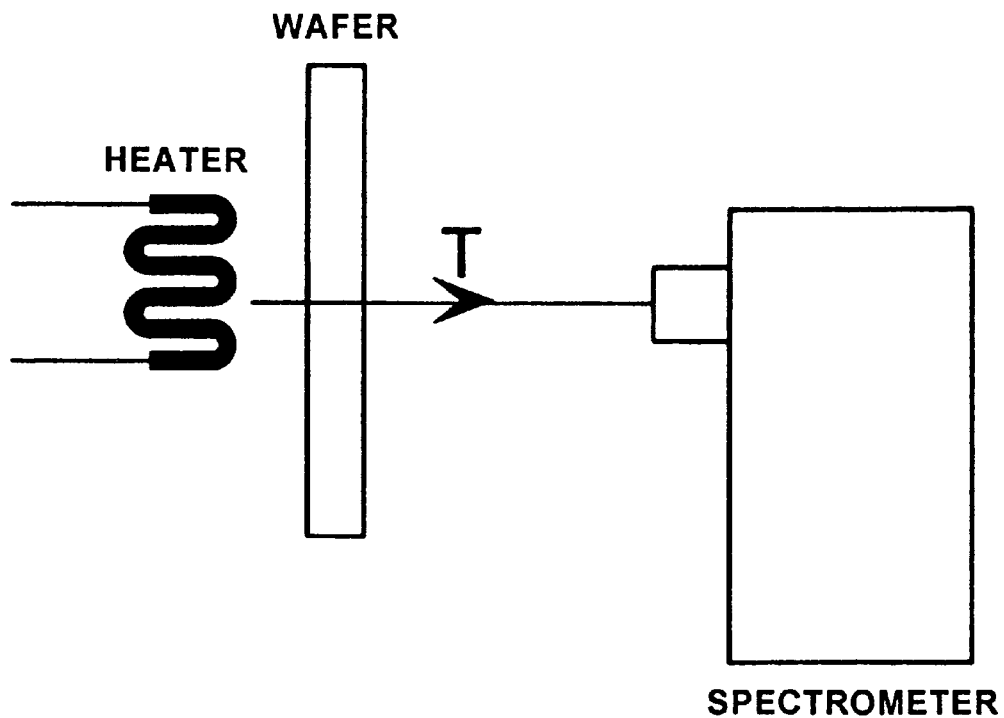
FIG. 1 is a schematic drawing of (a) the transmission method of optical bandgap thermometry and (b) the diffuse reflection method.
Figure 1B:
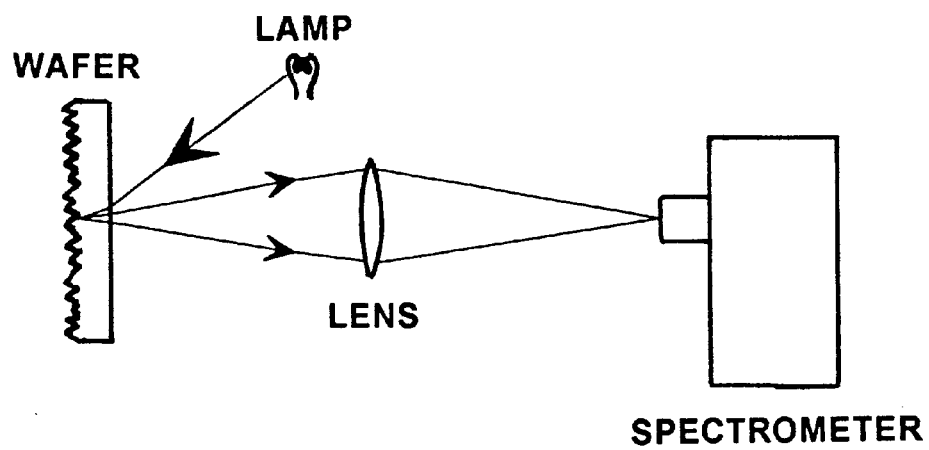
Figure 2:
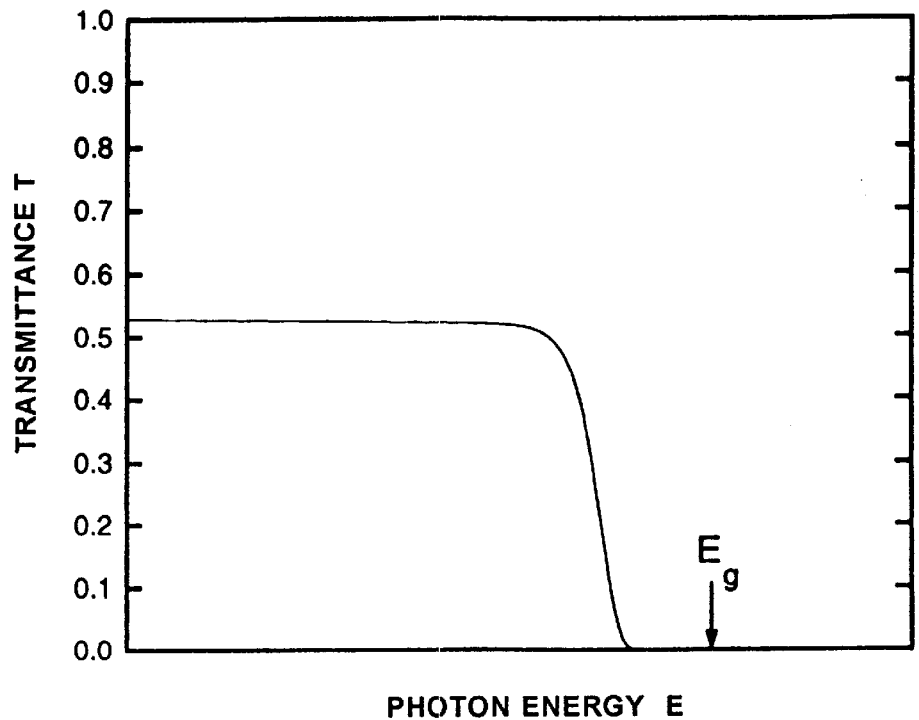
FIG. 2 is a graph of an optical transmission spectrum of a semiconductor in the vicinity of its bandgap.
Figure 3:
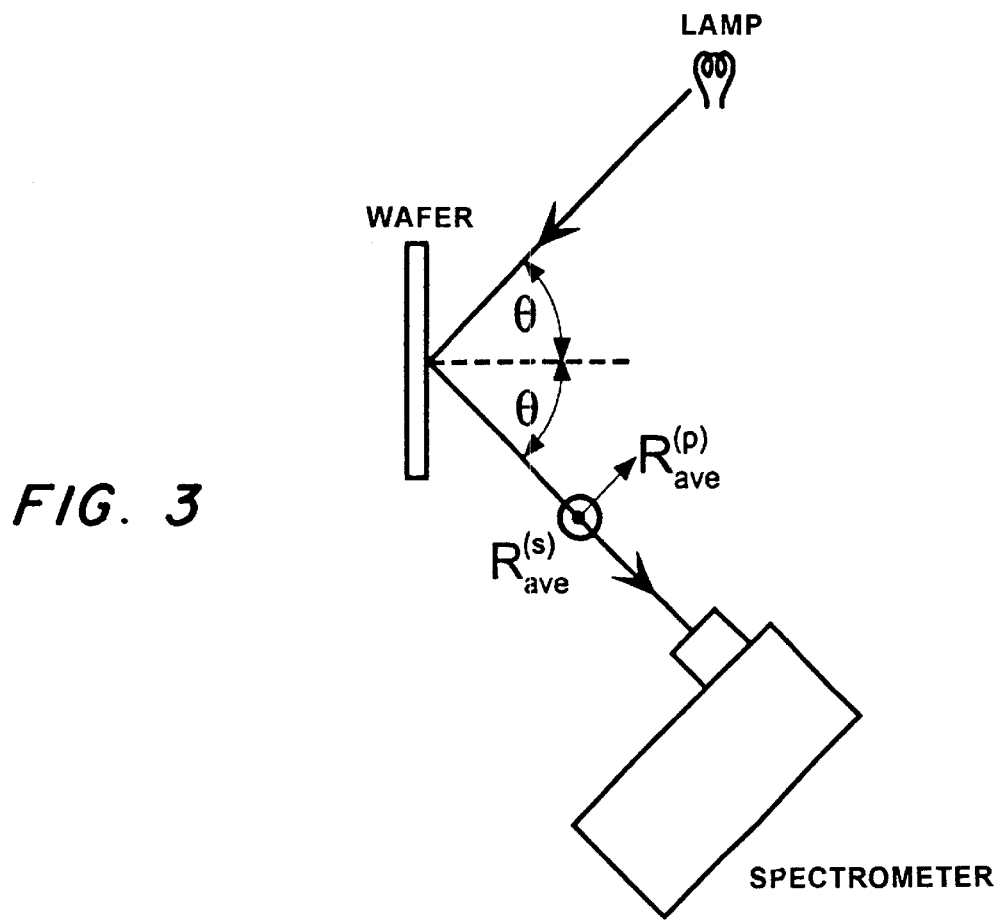
FIG. 3 is a schematic drawing of specular reflection optical bandgap thermometry. The angle of incidence is θ and $R_{ave}^{(s)}$ and $R_{ave}^{(p)}$ are the averaged reflectances for s and p polarization, respectively.

To understand the invention better, we begin with a theoretical model of specular reflection optical bandgap thermometry. The essentials of specular reflection are shown in FIG. 3. Broadband light is focused onto the sample at an angle of incidence θ. The light is either s polarized or p polarized. The specularly reflected light is focused into a spectrometer.

Figure 4:
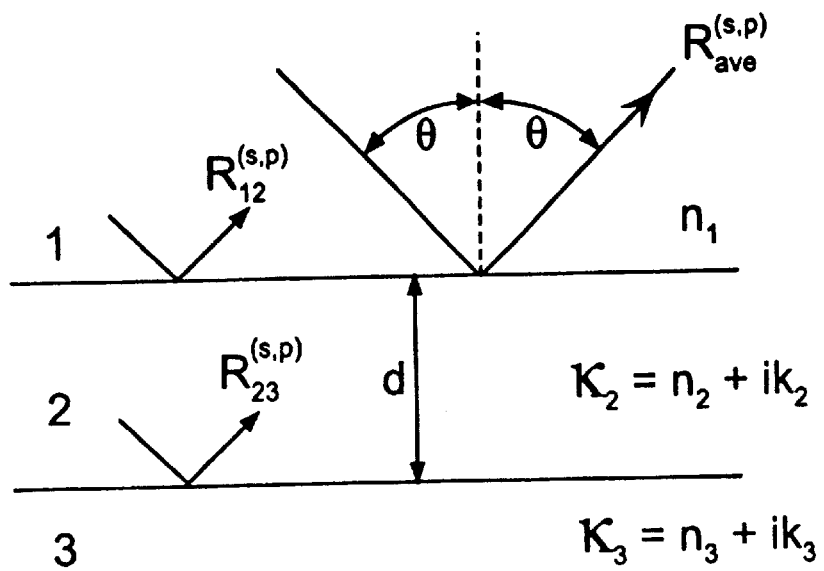
FIG. 4 illustrates a three-media optical model used to calculate the reflectance $R_{ave}^{(s,p)}$.

The general optical model is shown in FIG. 4. The sample has thickness d and complex refractive index $\kappa_2 = n_2 + ik_2$, where $n_2$ and $k_2$ are the refractive index and extinction coefficient; respectively. The front of the sample faces vacuum or air so that $n_1=1$. The sample is backed by a medium that in general has a complex refractive index $\kappa_3 = n_3 + ik_3$. The samples are usually sufficiently thick (>~100 μm) so that multiple reflections within the sample add incoherently. Then the average reflectance is given by the procedure in M. A. Heald and C. B. Wharton, *Plasma Diagnostics with Microwaves*, p. 130, Wiley, New York, 1965, as $$R_{ave}^{(s,p)} = \frac{R_{12}^{(s,p)} + R_{23}^{(s,p)}(1 - 2R_{12}^{(s,p)})\exp(-2\alpha d^*)}{1 - R_{12}^{(s,p)} R_{23}^{(s,p)} \exp(-2\alpha d^*)}, \quad (1)$$

where the (s,p) superscripts indicate s and p polarization, respectively. The individual interface reflectances are given by $$R_{12}^{(s)} = \left|\frac{n_1\cos\theta - (n_2 + ik_2)\cos\theta_2}{n_1\cos\theta + (n_2 + ik_2)\cos\theta_2}\right|^2 \quad (2a)$$

$$R_{12}^{(p)} = \left|\frac{-(n_2 + ik_2)\cos\theta + n_1\cos\theta_2}{(n_2 + ik_2)\cos\theta + n_1\cos\theta_2}\right|^2 \quad (2b)$$

$$R_{23}^{(s)} = \left|\frac{(n_2 + ik_2)\cos\theta_2 - (n_3 + ik_3)\cos\theta_3}{(n_2 + ik_2)\cos\theta_2 + (n_3 + ik_3)\cos\theta_3}\right|^2 \quad (3a)$$

$$R_{23}^{(p)} = \left|\frac{-(n_2 + ik_2)\cos\theta_3 + (n_3 + ik_3)\cos\theta_2}{(n_2 + ik_2)\cos\theta_3 + (n_3 + ik_3)\cos\theta_2}\right|^2, \quad (3b)$$

where $\theta_2$ and $\theta_3$ are the refraction angles in the sample and medium 3, respectively. In addition, $$d^* = \frac{d}{\cos[Re(\theta_2)]} \quad (4)$$

and $$\alpha = \frac{4\pi k_2}{\lambda}, \quad (5)$$

where α is the intensity absorption coefficient of the sample and λ is the photon wavelength. In Eq. (4) $\theta_2$ varies from 0 to ~16° as θ ranges from normal incidence to 90°. Thus, even with θ near 90°, d* is only ~4% larger than d.

Figure 5:
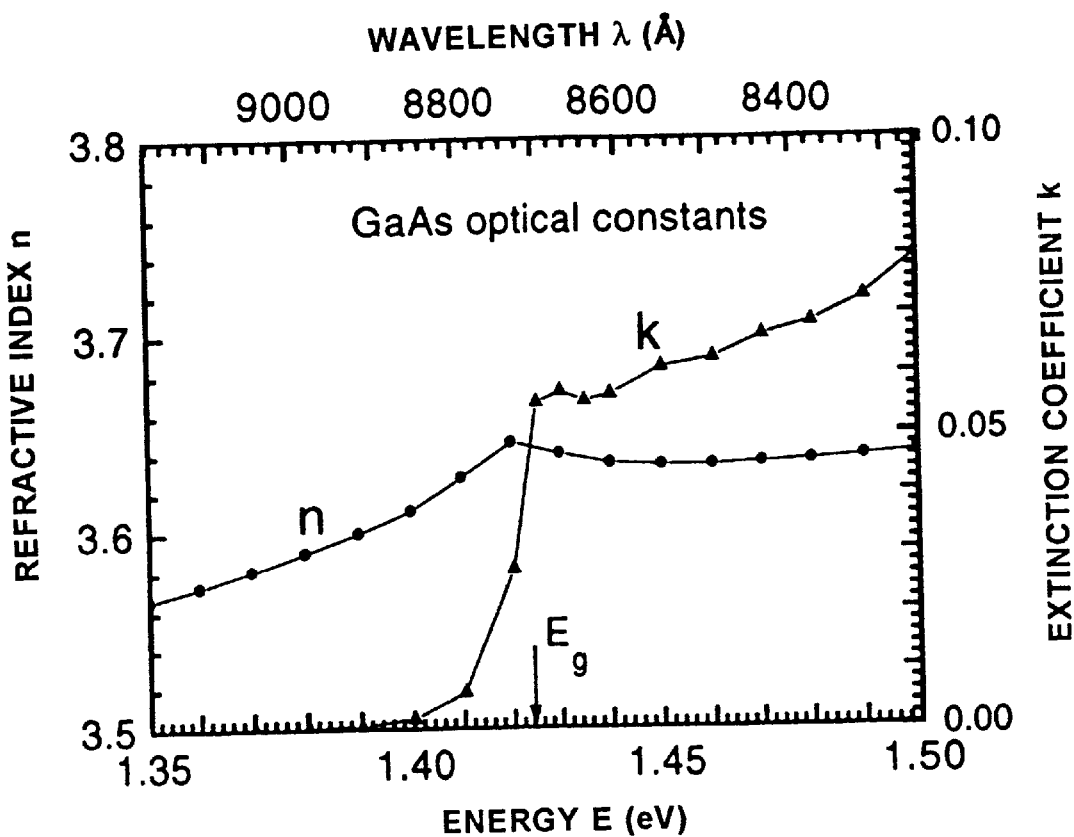
FIG. 5 is a graph of room temperature optical constants for GaAs in the vicinity of its bandgap.

The general features of specular reflection optical bandgap thermometry are illustrated with GaAs, although the ideas equally apply to most semiconductors. Nominal room-temperature optical constants obtained from D. E. Aspnes, *Properties of Gallium Arsenide*, EMIS Datareview RN=15437, p. 157, 1990 and E. D. Palik, "Gallium Arsenide (GaAs)," in *Handbook of Optical Constants of Soilids* (E. D. Palik, ed.), p. 429, Academic Press, New York, 1985 for GaAs in the region of the bandgap are shown in FIG. 5 as a function of photon energy E; these optical constants will be used in subsequent calculations. The bandgap energy at room temperature (T=21° C.) is $E_g$=1.425 eV. Just below $E_g$, k increases rapidly with photon energy, resulting in the absorption edge. Above $E_g$, k varies approximately linearly. The refractive index, which can be considered constant, is much larger than the extinction coefficient. Thus, $k_2$ may be set equal to zero in Eqs. (2) and (3).

Figure 6:
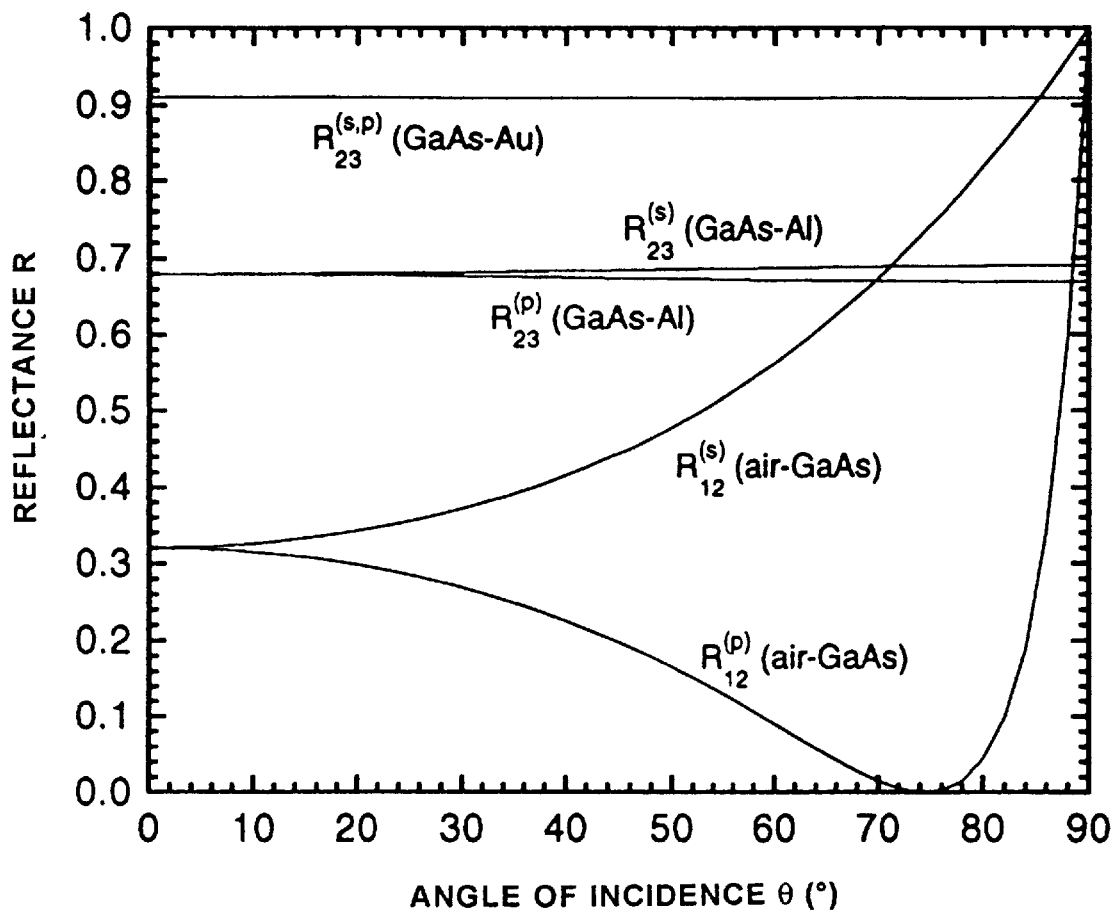
FIG. 6 is a graph of single-interface reflectances as a function of the angle of incidence θ. The s and p polarized reflectances are shown for an air-GaAs, a GaAs-Au and a GaAs-Al interface.

Let us consider the two limiting cases of (1) the sample is backed by air (i.e., freely suspended) and (2) the sample is backed by a highly reflecting metal. In the first case, $n_3$=1, $k_3$=0, and $R_{23}^{(s,p)}=R_{12}^{(s,p)}$. The air-GaAs interface reflectances [Eqs. (2)] as a function of the angle of incidence, θ, are presented in FIG. 6 for $n_2$=3.6. Note that $R_{12}^{(s)}$ increases monotonically as θ varies from 0 to 90°. $R_{12}^{(p)}$ initially decreases, reaches zero at θ~75°, and then quickly rises. The angle at which $R_{12}^{(p)}$=0 is known as Brewster's angle. Brewster's angle $\theta_B$, is given by $\tan(\theta_B)=n_2/n_1$, where $n_2$ is the refractive index of the sample and $n_1$ is the refractive index of the incident medium, nominally air.

Figure 7A:
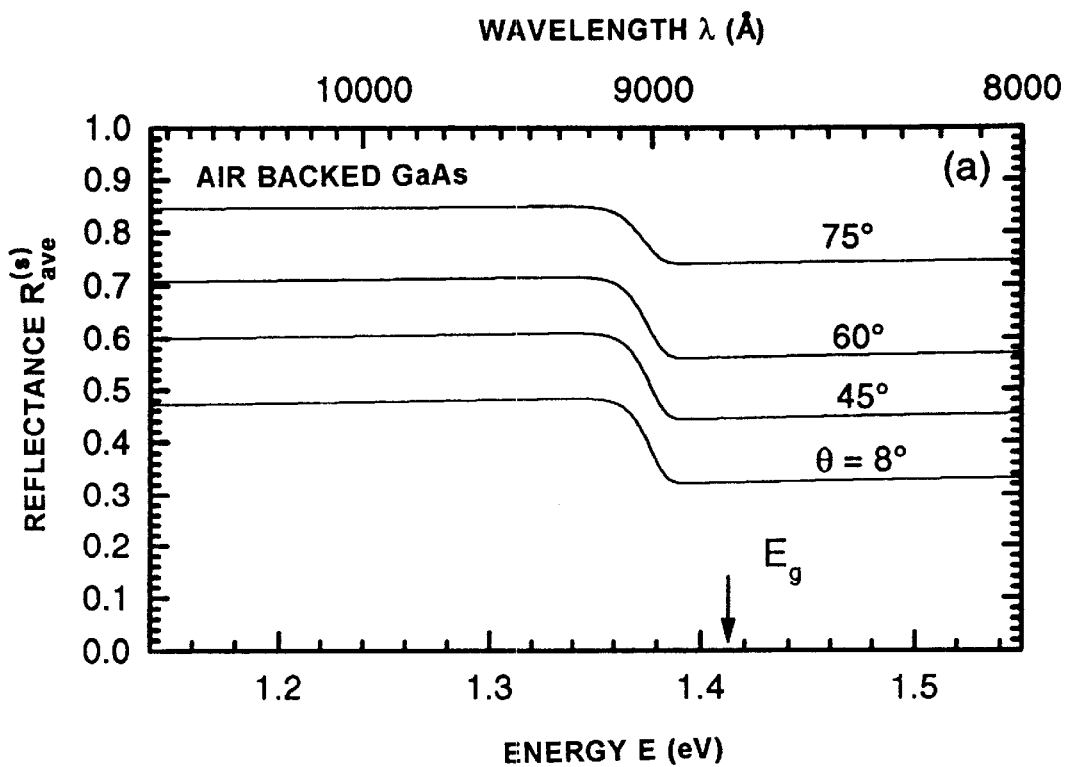
FIG. 7 is four graphs of calculated room-temperature reflectances of a 635-μm thick GaAs sample as a function of photon energy for four values of θ where (a) is air backed, s polarization, (b) is air backed, p polarization, (c) is Au backed, s polarization and (d) is Au backed, p polarization.
Figure 7B:
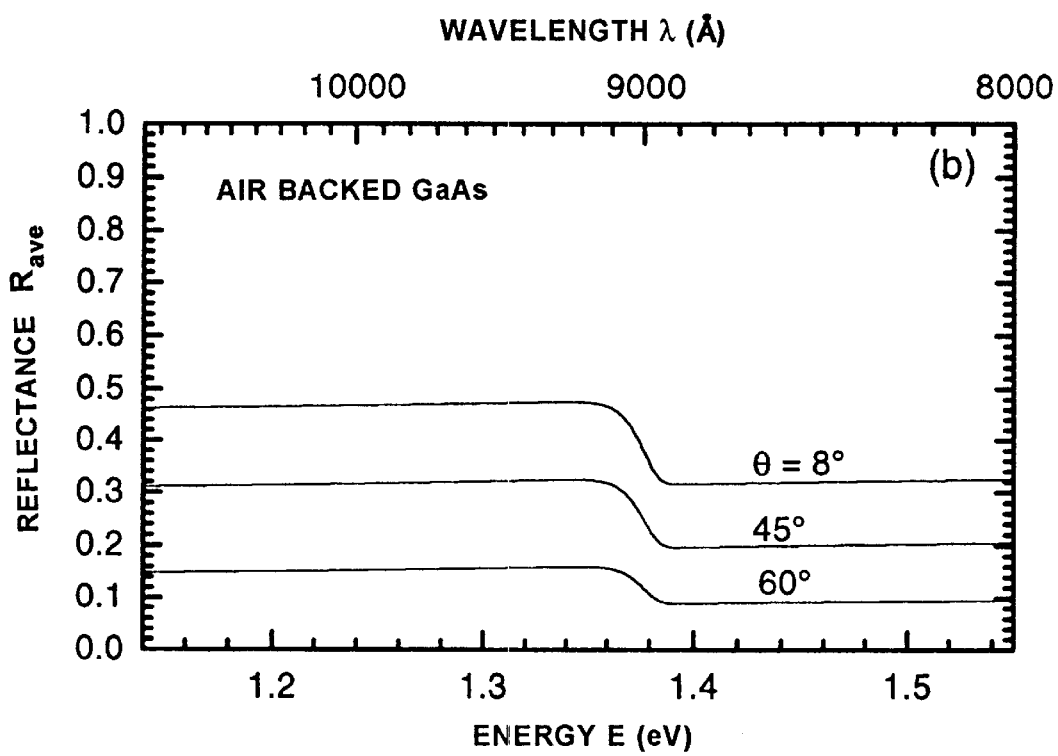

Calculated reflectances $R_{ave}^{(s)}$ and $R_{ave}^{(p)}$ from Eq. (1) for an air backed sample (d=635 μm) as a function of photon energy are shown in FIGS. 7(a) and 7(b), respectively, for four values of θ. Two characteristics are immediately apparent: (1) the curves have a sigmoidal line shape and (2) the reflectance for s polarization increases for larger values of θ, whereas the p-polarized reflectance decreases. As expected from FIG. (6), $R_{ave}^{(p)}$ is nearly zero for θ=75°.

For the second limiting case, we shall consider the back side of the sample to be coated by gold, Au. We assume that the gold film is ideal and thick enough to be considered semi-infinite (>300 Å). The optical constants for gold at E~1.4 eV are $n_3$=0.22 and $k_3$=6 as seen from D. W. Lynch and W. R. Hunter, "Comments on the Optical Constants of Metals and an Introduction to the Data for Several Metals," in *Handbook of Optical Constants of Soilids* (E. D. Palik, ed.), p. 429, Academic Press, New York, 1985. As shown in FIG. (6), the reflectances calculated from Eqs. (3) for s and p polarization at the GaAs-Au interface are 1) nearly identical, 2) essentially independent of θ, and 3) almost equal to unity.

Figure 7C:
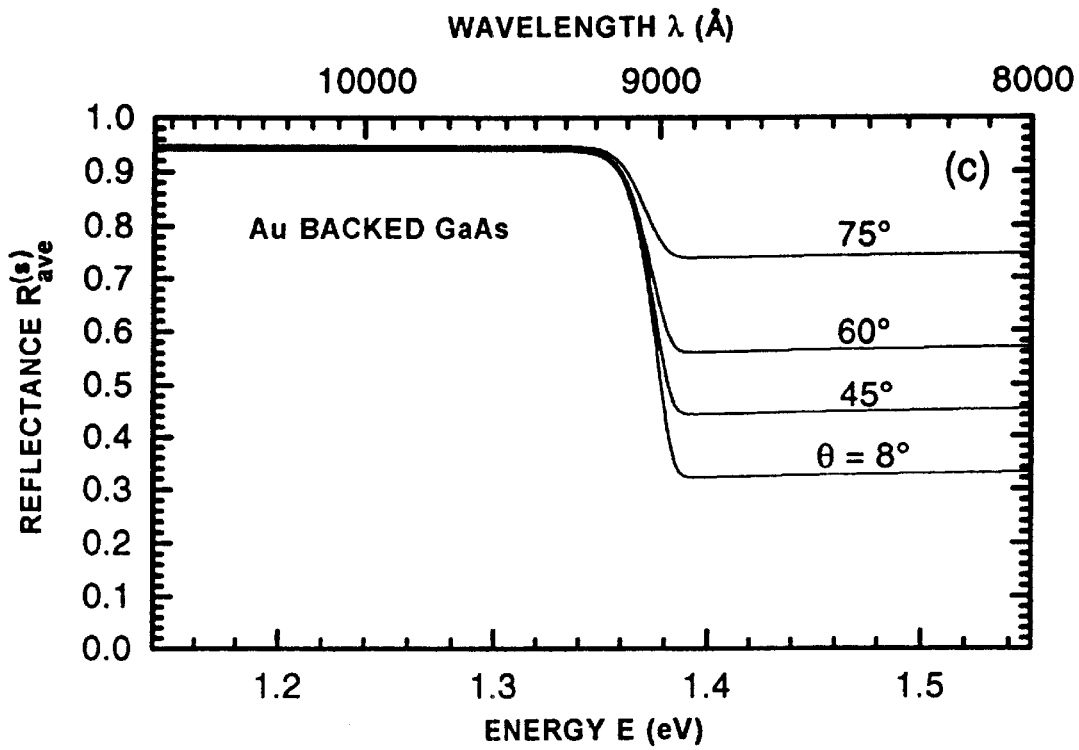
Figure 7D:
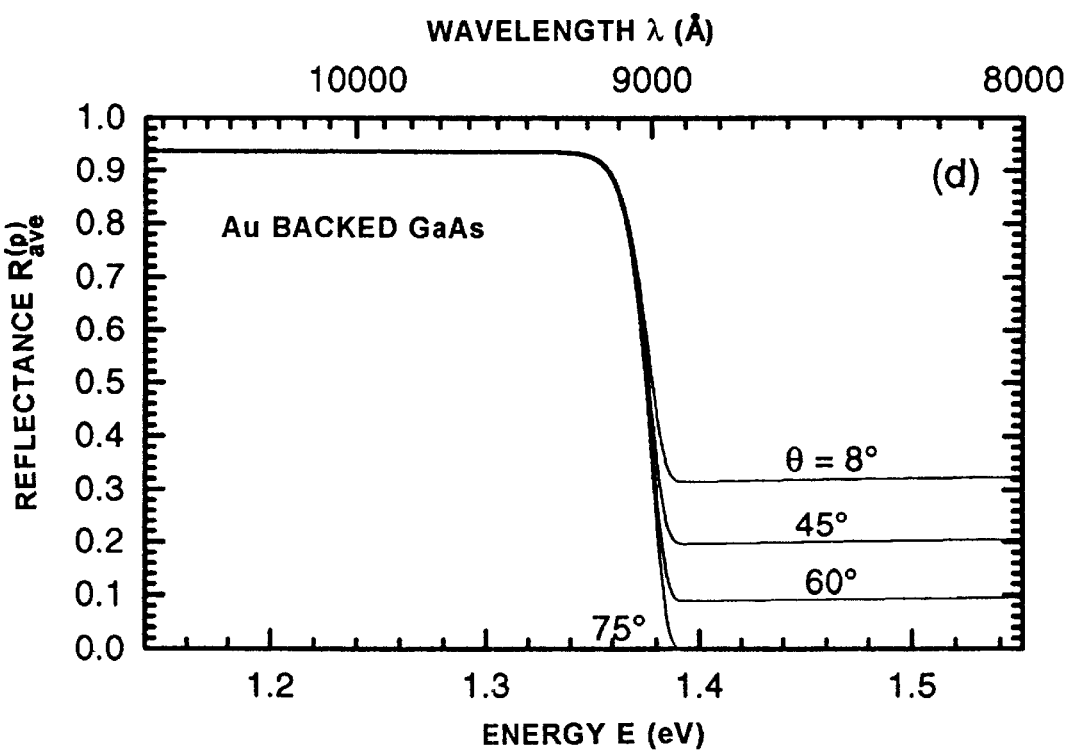

The s- and p-polarized average reflectances calculated from Eq. (1) for a gold-backed sample are shown in FIGS. 7(c) and 7(d), respectively. Comparing FIGS. 7(c) and 7(d) with FIGS. 7(a) and 7(b), two features are evident. First, for photon energies above the bandgap, the air-backed reflectances are the same as the Au-backed reflectances. Second, below the bandgap, the Au-backed reflectances are substantially larger. As can be seen, the dynamic range is greater for a metal-backed sample; the dynamic range is defined as the ratio of the reflectance below the bandgap to that above the bandgap. For s polarization the dynamic range increases as the angle of incidence decreases, whereas for p polarization the dynamic range increases as the angle of incidence increases. In particular, at θ=75° $R_{ave}^{(p)}$ changes from nearly unity below $E_g$ to essentially zero above $E_g$; thus the dynamic range is largest at Brewster's angle. In addition, the signal-to-noise ratio is much larger than that of diffuse reflectance.

The room-temperature behavior of specular reflectance has been shown in FIGS. 7a–7d. The following section discusses what happens when the temperature changes. Although both optical constants vary with temperature, the largest, and most important, change is in the extinction coefficient. Below the bandgap the absorption coefficient varies exponentially with photon energy and is referred to as the Urbach tail. See G. Antonioli, D. Bianchi and P. Franzosi, "Intrinsic Urbach rule and electron-phonon interaction in GaAs and related III–V compounds," Phys. Stat. Sol. (b) 106, 79 (1981) and S. R. Johnson and T. Tiedje, "Temperature dependence of the Urbach edge in GaAs," J. Appl. Phys. 78, 5609 (1995). The Urbach tail is given by $$\alpha(T,E) = \alpha_o(T)\exp\{B(T)[E - E_g(T)]\}, \quad (6)$$

where $\alpha_0(T)$ is the value of the absorption coefficient at the bandgap, B(T) is the Urbach slope parameter, and T is the sample temperature. The letter T is used to denote temperature and the letter T' is used to denote transmittance. The correct meaning should be clear from the context. Note also that all three parameters $\alpha_o$, B, and $E_g$ are functions of T. The temperature dependencies of $\alpha_o$ and B are not well known, although they probably do not vary much. At room temperature $\alpha_0 \sim 7200$ cm$^{-1}$ and B$\sim 167$ eV$^{-1}$. The temperature dependence of the bandgap energy is usually given by a Varshnii expression, as described by D. Kirillov and R. A. Powell, MIMIC Phase III Contract No. DAAL01-89-C-0907, final report, April 1991 and C. D. Thrumond, "The standard thermodynamic functions for the formation of electrons and holes in Ge, Si, GaAs, and GaP," J. Electrochem. Soc. 122, 1133 (1975), as $$E_g(T) = E_o - \frac{aT^2}{b+T}, \quad (7)$$

where
$E_o = 1.525$
$a = 5.85 \times 10^{-4}$ eV/K
$b = 204$ K.

Figure 8:
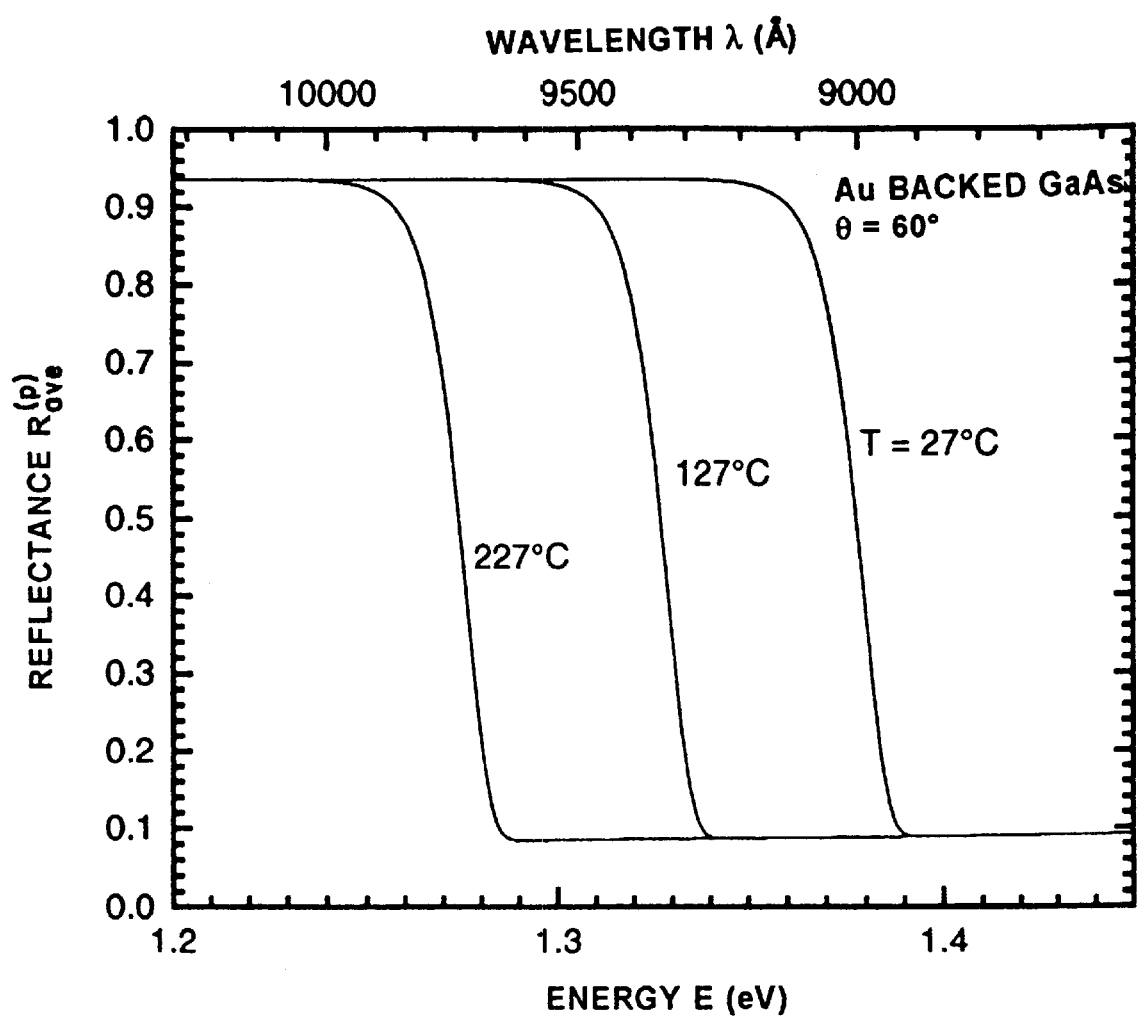
FIG. 8 is a graph of calculated p-polarized reflectances of a 635-μm thick GaAs sample at θ=60° as a function of photon energy for three sample temperatures.

To illustrate how the reflectance varies with temperature, $R_{ave}^{(p)}$ is plotted for an Au-backed sample with $\theta = 60°$ at T=27, 127 and 227 ° C. in FIG. 8. Neglecting the temperature dependence of $\alpha_o$ and B, $E_g$ is substituted from Eq. (7) into Eq. (6). These values of $\alpha$ were then used in Eq. (5). As can be seen, the position of the Urbach tail (i.e., the absorption edge) shifts to lower energy as the sample temperature increases, whereas its shape remains essentially the same.

There are three steps in determining the sample temperature in the present procedure. The first is measuring the specular reflectance. The second is locating a significant marker on the absorption edge. The third is matching the position of the marker with a calibration curve.

Two convenient markers associated with the absorption edge are the inflection point as discussed by D. Kirillov and R. A. Powell, in their MIMIC Phase III Contract No. DAAL01-89-C-0907, final report, April 1991 and in their U.S. Pat. No. 5,118,200 and the high-energy knee as discussed by M. K. Weilmeier, K. M. Colbow, T. Tiedje, T. Van Buuren, and L. Xu, "A new optical temperature measurement technique for semiconductor substrates in molecular beam epitaxy," Can. J. Phys. 69, 422 (1991); S. R. Johnson, et al., U.S. Pat. No. 5,388,909; and S. R. Johnson and T. Tiedje, "Effect of substrate thickness, back surface texture, reflectivity, and thin film interference on optical bandgap thermometry," J. Crys. Growth 175/176, 273 (1997).

Figure 9:
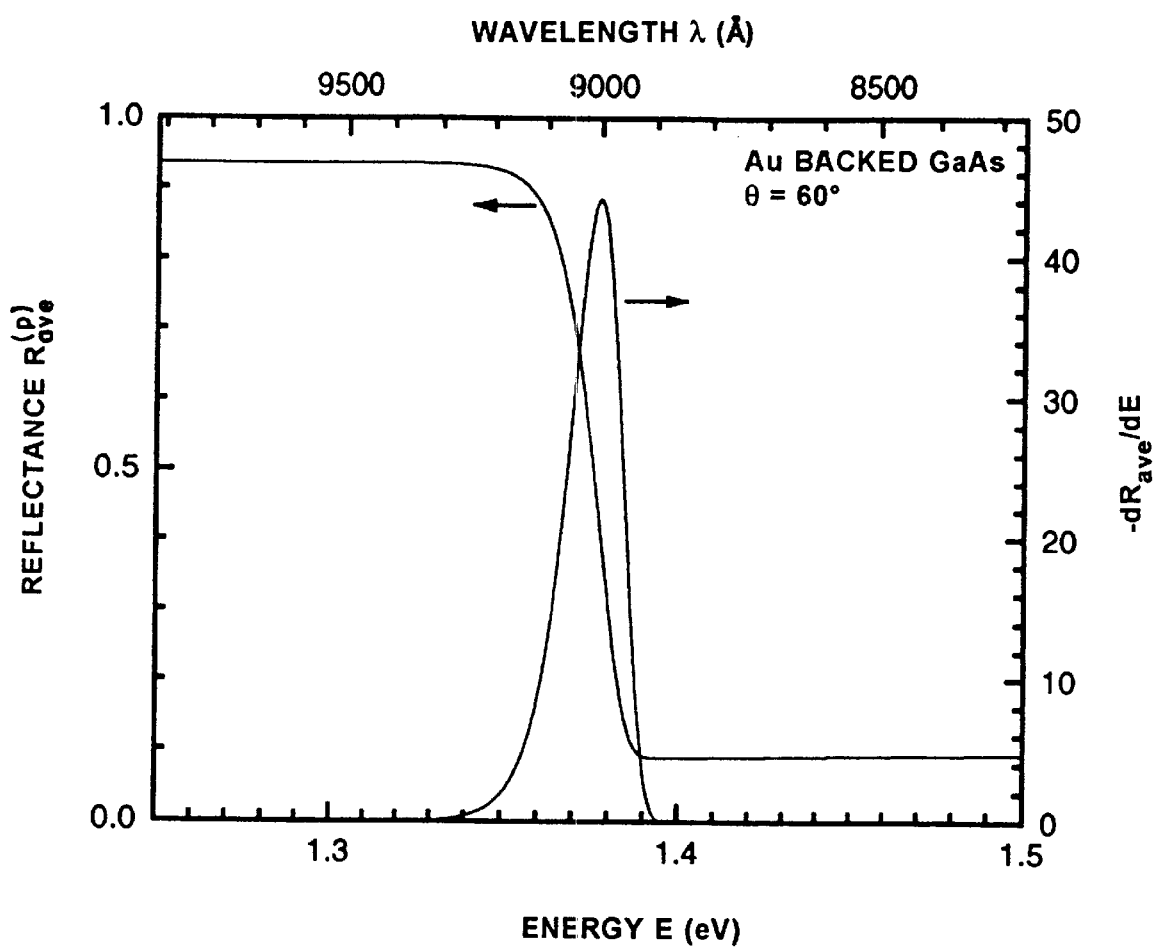
FIG. 9 is a graph of the θ=60° reflectance spectrum from FIG. 7(d) and its numerical derivative.

The easier procedure is to determine the energy position of the inflection point of a sigmoidal reflection spectrum. The first derivative of a reflection spectrum is a bell-shaped curve. The position of the inflection point is given by the position of the peak of the first derivative. For example, FIG. 9 shows $R_{ave}^{(p)}$ for $\theta = 60°$, taken from FIG. 7(d), and its first derivative, $dR_{ave}^{(p)}/dE$ (Note: for convenience the derivative curve has been inverted.)

In general, for a given temperature, the position of the first derivative peak depends on the angle of incidence and on the polarization. Expanding Eq. (1) in a power series yields $$R_{ave}^{(s,p)} \approx R_{12}^{(s,p)} + R_{23}^{(s,p)}(1-R_{12}^{(s,p)})^2 \exp(-2\alpha d^*)$$
$$+ R_{12}^{(s,p)}(R_{23}^{(s,p)})^2(1-R_{12}^{(s,p)})^2 \exp(-4\alpha d^*)$$
$$+ (R_{12}^{(s,p)})^2(R_{23}^{(s,p)})^3(1-R_{12}^{(s,p)})^2 \exp(-6\alpha d^*). \quad (8)$$

To explain the physics better, we consider an Au-backed sample for p polarization with $\theta$ near Brewster's angle. Then $R_{12}^{(p)} \sim 0$ and the $R_{23}^{(p)}$ value of 0.91 can be considered about equal to unity (see FIG. 6). Equation (8) thus simplifies to $$R_{ave}^{(p)} \approx \exp(-2\alpha d^*). \quad (9)$$

Thus it can be seen from the factor of two in the exponent in Eq. (9) that the absorption of the light is a result of the light passing through the sample twice. In transmission the light passes through the sample once.

To find the energy position $E_{ip}$ of the inflection point at Brewster's angle in terms of the Urbach tail, substitute Eq. (6) into Eq. (9), take the second derivative, set it equal to zero and solve for $E_{ip}$. This procedure yields $$E_{ip}^{(p)} = E_g(T) - \frac{\ln[2\alpha_o(T)d^*]}{B(T)}. \quad (10)$$

Figure 10:
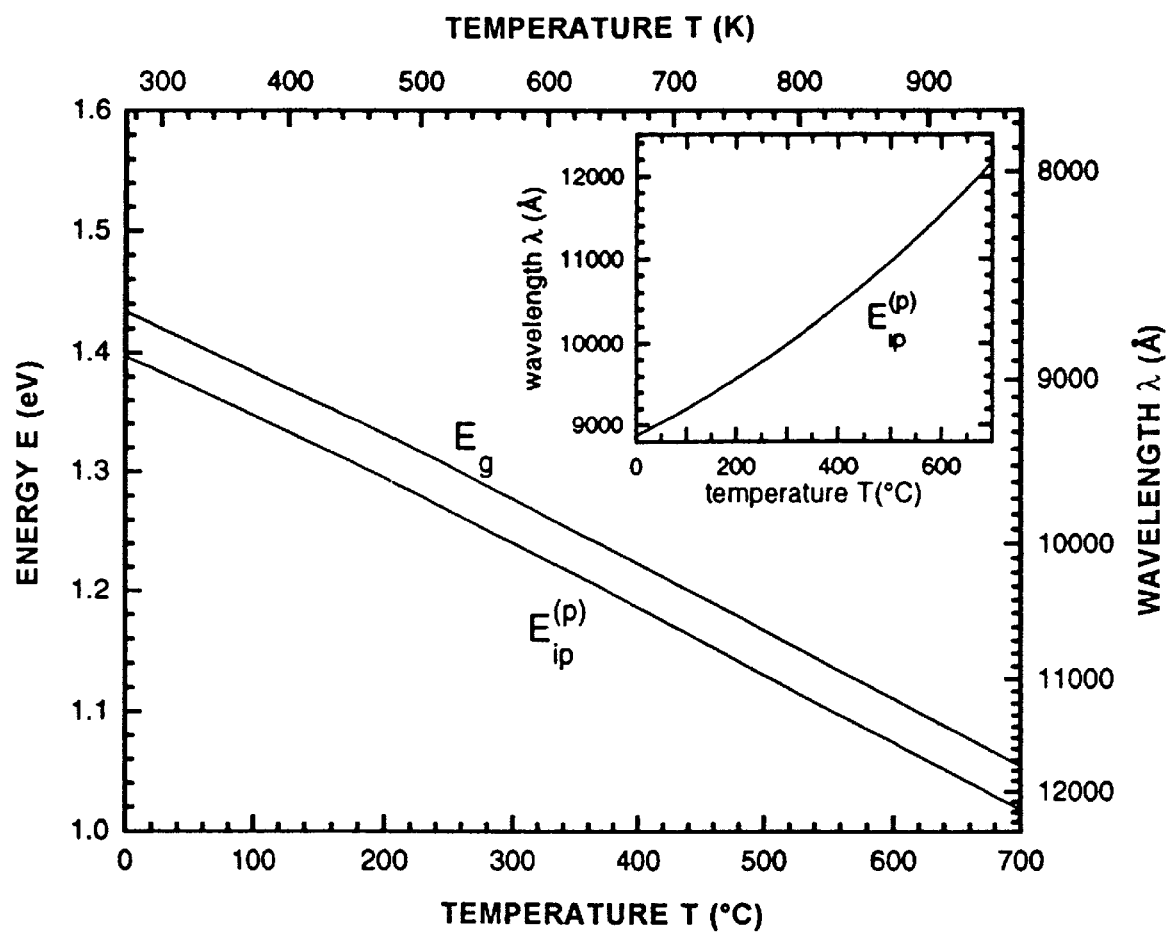
FIG. 10 is a graph of the optical bandgap $E_g$ and the inflection point position $E_{ip}^{(p)}$ at Brewster's angle for GaAs as a function of temperature. The inset shows $E_{ip}^{(p)}$ expressed in Å.

The second term in Eq. (10) is small compared to $E_g$ so that most of the temperature sensitivity of $E_{ip}^{(p)}$ is due to the temperature dependence of $E_g$. Substituting the values for $d^*$, $\alpha_o$ and B into Eq. (10), the second term at room temperature is approximately equal to 41 meV. Thus, the inflection point is shifted down from the bandgap by 41 meV. If $\alpha_o$ and B were temperature independent, then the second term would be a constant offset. FIG. 10 shows both $E_{ip}^{(p)}$ and $E_g$, as a function of temperature, where we assumed that $\alpha_o$ and B are constant. $E_{ip}^{(p)}$ is essentially linear in photon energy; thus over a wide temperature range the sensitivity of the measurement is ~0.54 meV/° C.

Most monochromators scan linearly in photon wavelength rather than in energy. The inset in FIG. 10 shows $E_{ip}^{(p)}$ expressed in Å [$\lambda(\text{Å}) = 12398/E(\text{eV})$] as a function of temperature. As can be seen, $E_{ip}^{(p)}$ is not linear in wavelength. As a result, the sensitivity is ~3 Å/° C. near room temperature, but increases to ~6 Å/° C. at 600 ° C.

Substituting Eq. (10) into Eq. (6), one finds that the inflection point at Brewster's angle occurs at the energy at which $$2\alpha d^* = 1. \quad (11)$$

Therefore, for samples with typical thicknesses of ~500 µm, $\alpha \sim 10$ cm$^{-1}$ at $E_{ip}^{(p)}$.

Figure 11:
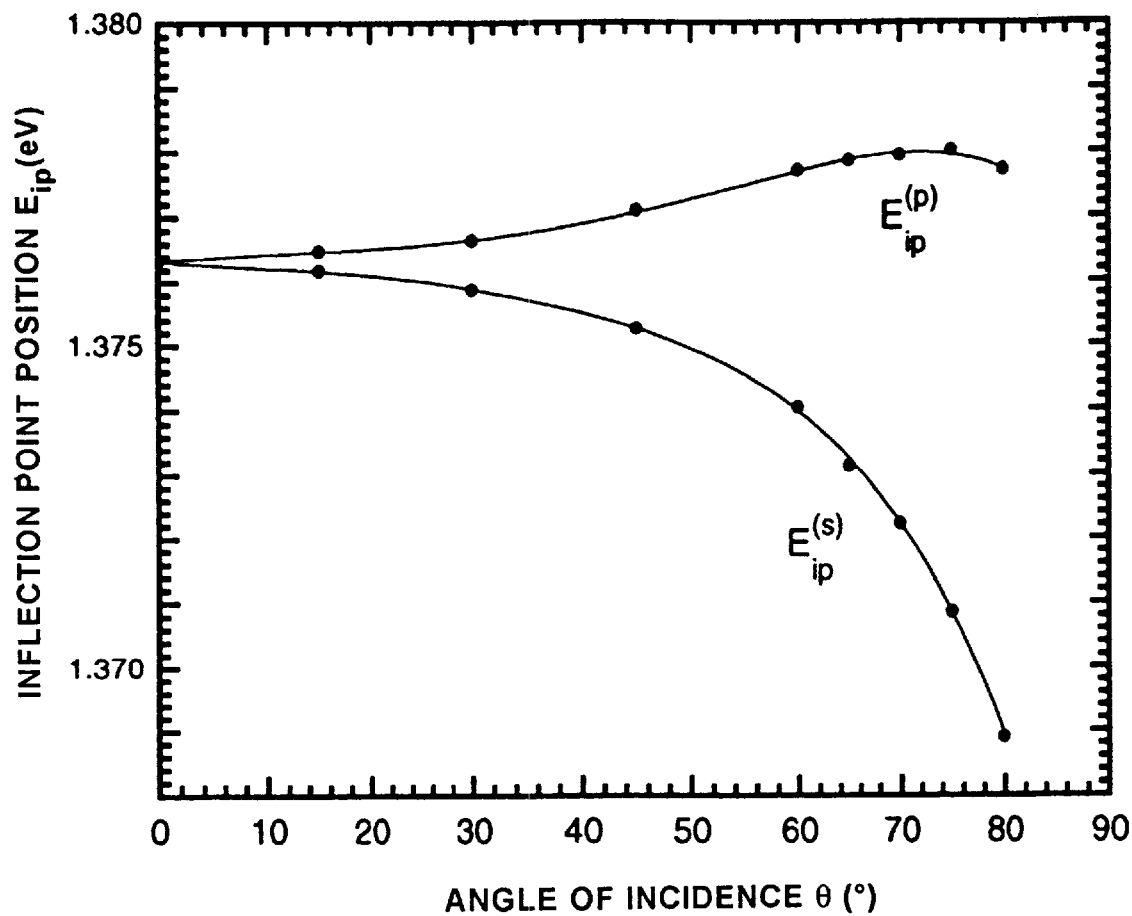
FIG. 11 is a graph of the inflection point position at room temperature for an Au backed GaAs sample as a function of the angle of incidence for s and p polarization.

The position of the inflection point varies with the angle of incidence for s and p polarization, as shown in FIG. 11. As $\theta$ decreases from Brewster's angle, $R_{12}^{(p)}$ increases so that the third term in Eq. (8) can no longer be neglected. At normal incidence ($R_{12}^{(p)} \sim 0.32$) the third term is ~0.3 of the second term at the inflection point. This has the effect of shifting the inflection point to lower energy. FIG. 11 shows the inflection point position $E_{ip}^{(p)}$ as a function of the angle of incidence. The curve was generated from Eq. (1). $R_{ave}^{(p)}$ was calculated for several values of $\theta$. The numerical derivative obtained from the Savitzky-Golay algorithm, as described by H. H. Madden, "Comments on the Savitzky-Golay convolution method for least-squares fit smoothing and differentiation of digital data," Anal. Chem. 50, 1383 (1978), was taken of each reflection curve. The position of the first derivative peak was determined and plotted in FIG. 11 as a solid circle. Finally, a continuous line was drawn through the points.

Now let us consider s polarization. As $\theta$ moves from normal incidence towards Brewster's angle, $R_{12}^{(s)}$ nearly doubles. Thus, near Brewster's angle the third term is ~0.55 of the second term near the inflection point. In addition, the fourth term in Eq. (8) is not negligible. Therefore, the position of the inflection point for s polarization shifts significantly as θ increases. FIG. 11 also shows $E_{ip}^{(s)}$, which was derived in the same way as $E_{ip}^{(p)}$. It can be seen that the inflection point for s polarization shifts more with the angle of incidence than for p polarization.

Figure 12:
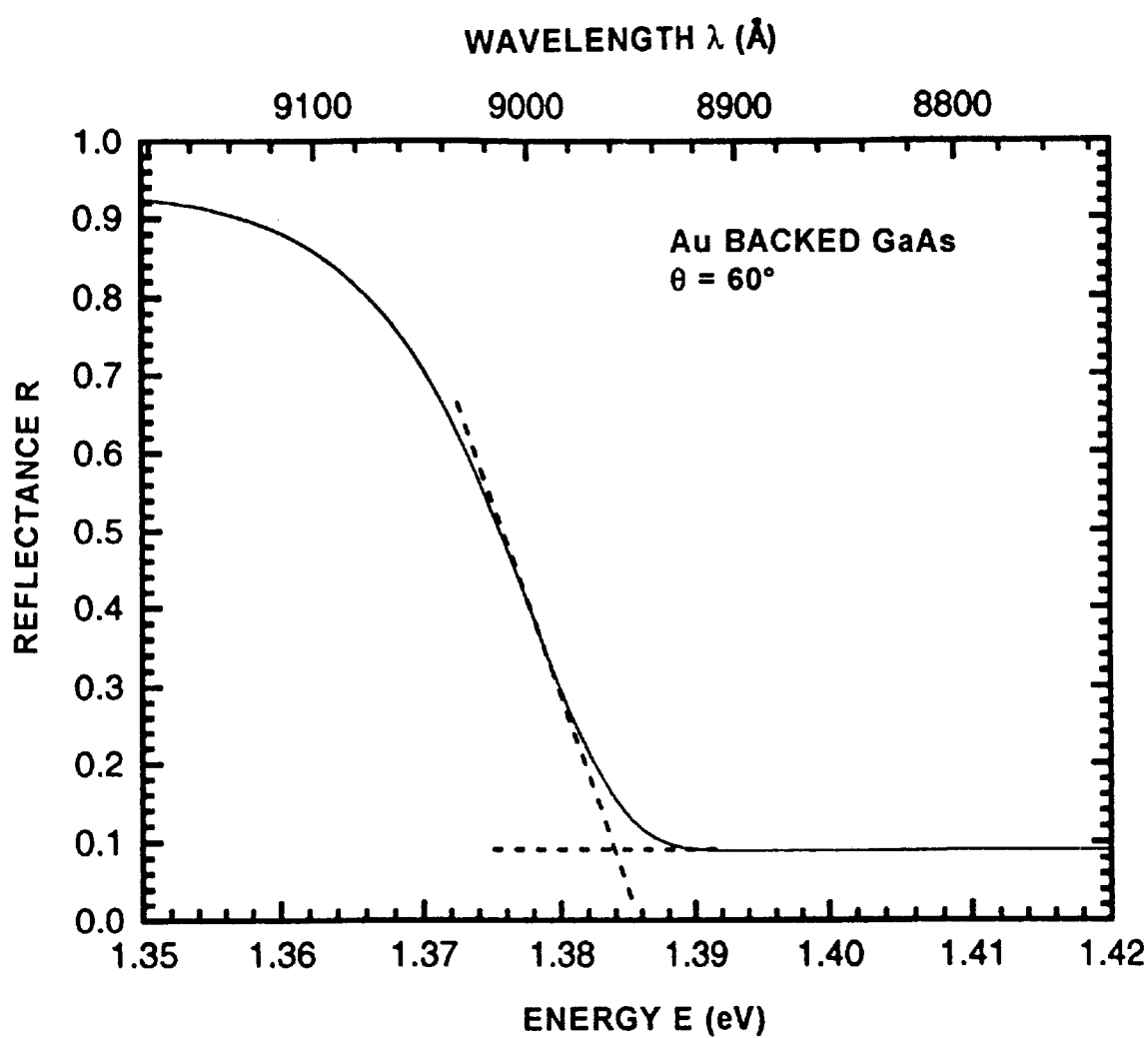
FIG. 12 is a graph showing the position of a high-energy knee (the intersection of the two dashed lines).

The second method of determining the position of the absorption edge is to determine the knee at the high-energy end of the absorption edge. The position of the knee is defined as the intersection of two asymptotic lines, as shown in FIG. 12. One line is a linear extrapolation from the high energy plateau of the spectrum and the other line is a linear extrapolation through the steepest section of the absorption edge. This has been described in detail by S. R. Johnson and T. Tiedje, "Effect of substrate thickness, back surface texture, reflectivity, and thin film interference on optical bandgap thermometry," J. Crys. Growth 175/176, 273 (1997). Comparing FIGS. 9 and 12 it is clear that the position of the knee is at a higher energy than that of the inflection point.

To determine the sample temperature, it is necessary to have a calibration curve that shows temperature as a function of the position of the inflection point or of the knee. In principle, Eq. (10) provides such a calibration curve. However, the temperature dependencies of $\alpha_o$, B and $E_g$ are not accurately known. Thus, the calibration curve is preferably generated empirically. Ideally, one would obtain the calibration curve under the same conditions as used in the experiment. However, this is often impractical, if not impossible. Therefore, an independent calibration experiment is required. The major problem is accurately measuring the sample temperature during the calibration.

The easiest way is to place a sample in an isothermal oven. The sample is in a tube with a thermal exchange gas. The temperature is measured with a calibrated thermocouple (or several) placed near the sample. A series of normal-incidence transmission spectra are recorded at known temperatures. The position of the inflection point of a transmission curve is given by (see D. Kirillov and R. A. Powell, MIMIC Phase III Contract No. DAALOI-89-C-0907, final report, April 1991)

$$E_{ip}^{(trans)}(T) = E_g(T) - \frac{\ln[\alpha_o(T)d]}{B(T)}. \tag{12}$$

Note that Eq. (12) is nearly the same as Eq. (10). Thus one can express $E_{ip}^{(p)}$ from Eq. (10) in terms of the results from the transmission method as $$E_{ip}^{(p)}(T) = E_{ip}^{(trans)}(T) - \frac{\ln(2)}{B(T)} - \frac{\ln[1/\cos(\theta_2)]}{B(T)}. \tag{13}$$

Thus, if B were temperature independent, the calibration curve for specular reflection at Brewster's angle for p polarization could be obtained just by shifting the transmission calibration curve. The specular reflectance can be measured at room temperature, which is easily and accurately measured. The position of the reflectance inflection point is then determined. One then shifts the experimental $E_{ip}^{(trans)}$ curve along the $E_{ip}$ axis until the curve intersects the inflection point. At room temperature the second term in Eq. (13) is ~4 meV. The third term is ~0.2 meV and can be neglected.

Figure 13:
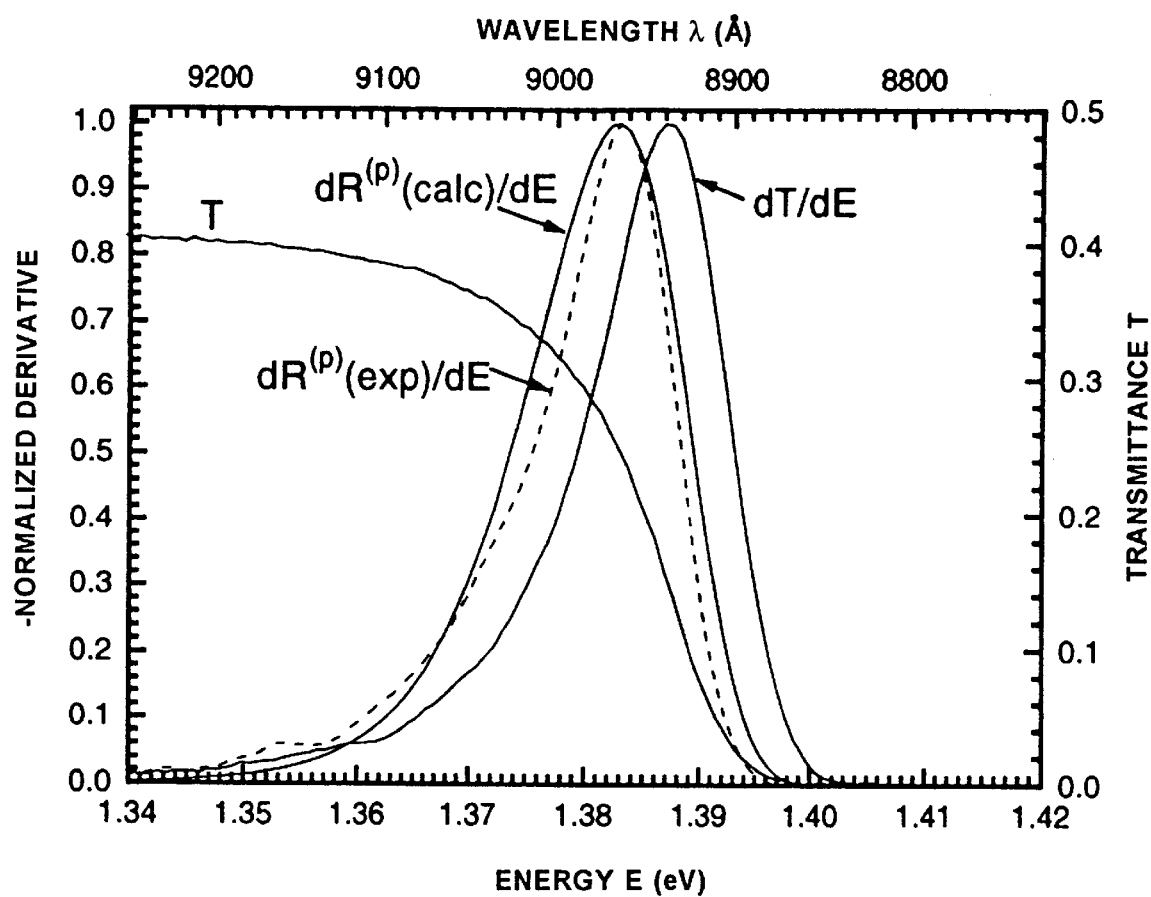
FIG. 13 is a graph of normal-incidence experimental transmittance T for a 635-μm thick GaAs sample at T=22° C. as a function of photon energy. The numerical derivative dT/dE is shown. The numerical derivatives of calculated and experimental p-polarized reflectances for θ=75° for an Al backed GaAs sample are also shown.

FIG. 13 shows the normal-incidence transmittance t of a semi-insulating GaAs sample with d=635 μm. The spectrum was obtained on a Cary 5E spectrophotometer at T=22° C. The numerical derivative dT/dE of the transmission spectrum is also presented; note that $E_{ip}^{(trans)}$=1.387 eV (8939

Å), in agreement with Eq. (12). D. Kirillov and R. A. Powell, in their MIMIC Phase III Contract No. DAAL01-89-C-0907, final report, April 1991 experimentally determined a transmission calibration curve. However, from their curve $E_{ip}^{(trans)}$=8995 Å.

The intensity absorption coefficient was calculated from the experimental transmission spectrum in FIG. 13 using $$T = \frac{(1-R_{12})^2 \exp(-\alpha d)}{1 - R_{12}^2 \exp(-2\alpha d)}, \tag{14}$$

where $R_{12}$ was calculated from Eq. (2a) with θ=0°, using $n_2$ from FIG. 5 and neglecting $k_2$. These values of α were used in Eq. (1) to calculate $R_{ave}^{(p)}$ for θ=75° and an Al backed sample. The optical constants for Al, as set forth in D. W. Lynch and W. R. Hunter, "Comments on the Optical Constants of Metals and an Introduction to the Data for Several Metals," in *Handbook of Optical Constants of Soilids* (E. D. Palik, ed.), p. 429, Academic Press, New York, 1985, at E~1.4 and n~2 and k~8. The numerical derivative $dR_{ave}^{(p)}$ (calc)/dE of this calculated $R_{ave}^{(p)}$ is shown in FIG. 13. As can be seen, its peak position is shifted down by 4 meV from the peak of dT/dE, as expected from Eq. (13).

Neglecting the temperature dependence of B results in an increasing error as the temperature increases. At t=600° C., B is probably between 55 and 85 $eV^{-1}$. See G. Antonioli, D. Bianchi and P. Franzosi, "Intrinsic Urbach rule and electron-phonon interaction in GaAs and related III–V compounds," Phys. Stat. Sol. (b) 106, 79 (1981) and S. R. Johnson and T. Tiedje, "Temperature dependence of the Urbach edge in GaAs," J. Appl. Phys. 78, 5609 (1995). Thus the shift due to the second term in Eq. (13) would be 8 to 12 meV, rather than 4 meV. If the temperature dependence of B is neglected, the apparent temperature would be approximately 8 to 16° C. higher than the actual temperature.

Having described the basic aspects of the invention, the following example is given to illustrate specific embodiments thereof

EXAMPLE 1

This example illustrates a procedure to measure temperature by specular reflection.

Figure 14:
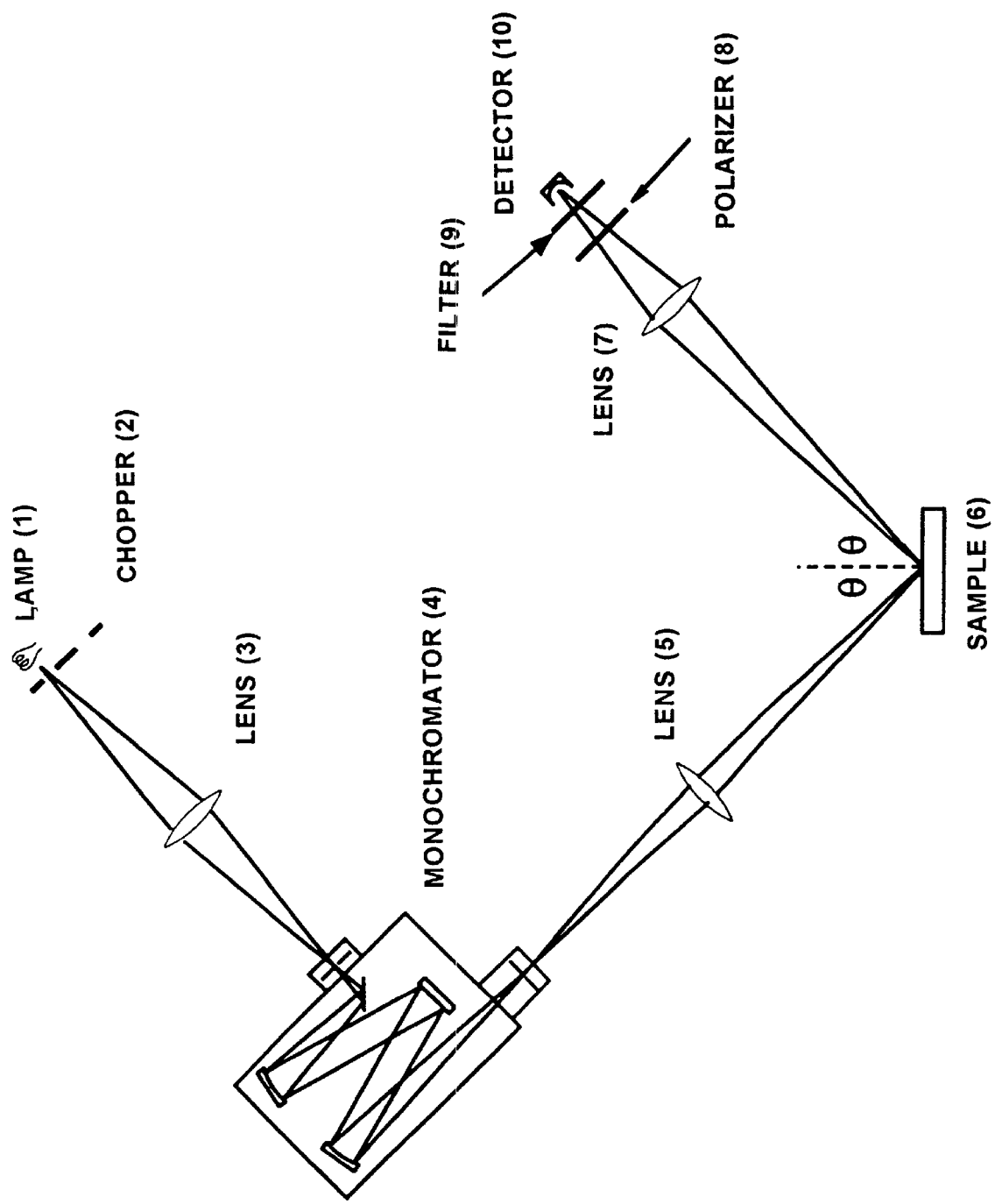
FIG. 14 is a schematic drawing of the experimental setup for specular reflectance. Standard lock-in connections and computer control have not been shown.

A typical experimental setup for specular reflection is shown in FIG. 14. Light from a quartz halogen lamp (1) is chopped (2) and focused by a lens (3) into the entrance slit of a monochromator (4). The monochromatic light from the exit slit is focused by a lens (5) onto the sample (6) at an angle of incidence θ. The specularly reflected light is focused by a lens (7) into a detector (10). The polarizer (8) passes either s or p polarized light and the filter (9) blocks second order light from the monochromator.

Figure 15A:
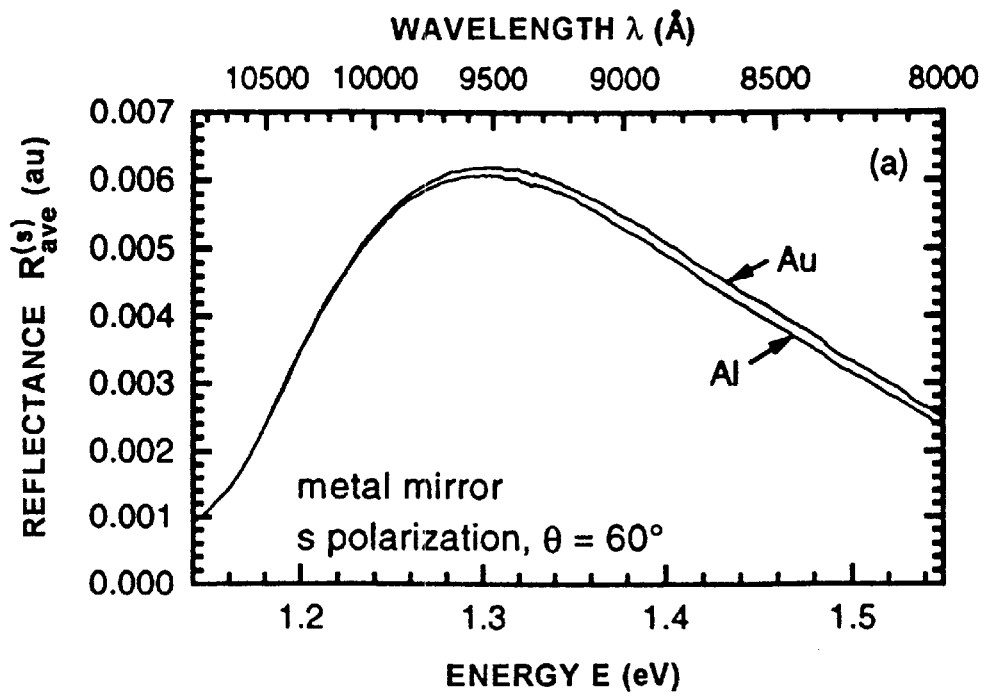
FIG. 15 is two graphs of typical experimental background spectra with sample replaced by either a gold or aluminum mirror where (a) is s polarization and (b) is p polarization.
Figure 15B:
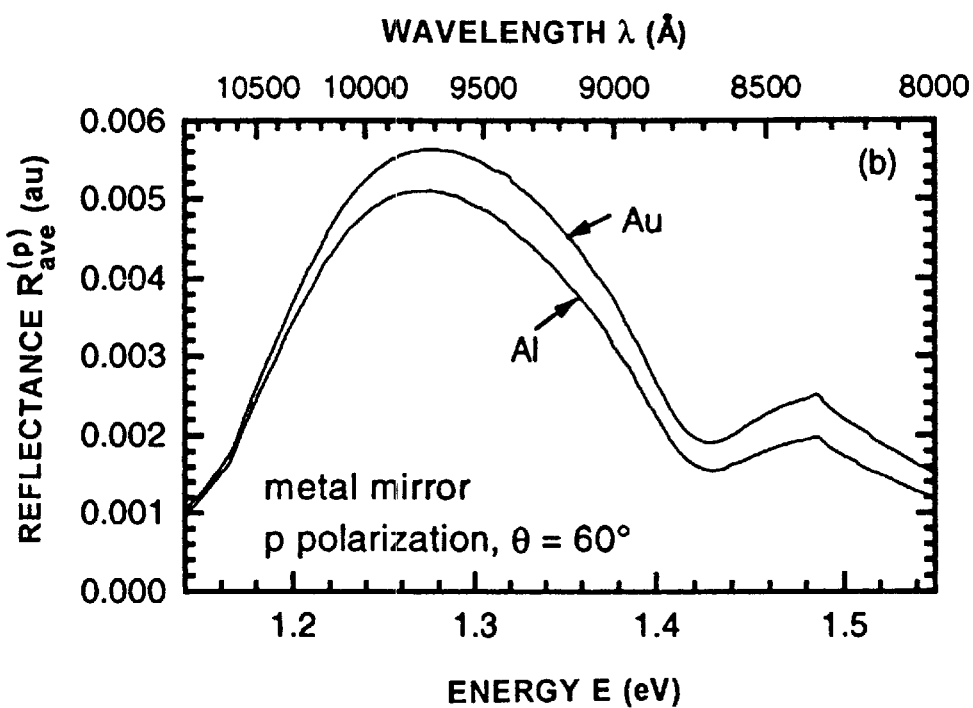

First, a background spectrum is recorded with the sample replaced by a mirror. The background spectrum gives the instrumental response of the experimental system, which includes the lamp, grating, detector, and filter responses. FIG. 15 shows typical background spectra; these were recorded at θ=60° from Au and Al mirrors for s and p polarizations. The reflected beam had a F/# of ~22, where the F/# is the ratio of the distance between the sample and the lens to the diameter of the reflected beam at the lens. The data points were taken with 5-Å steps. The slits were 0.2 mm wide.

Figure 16A:
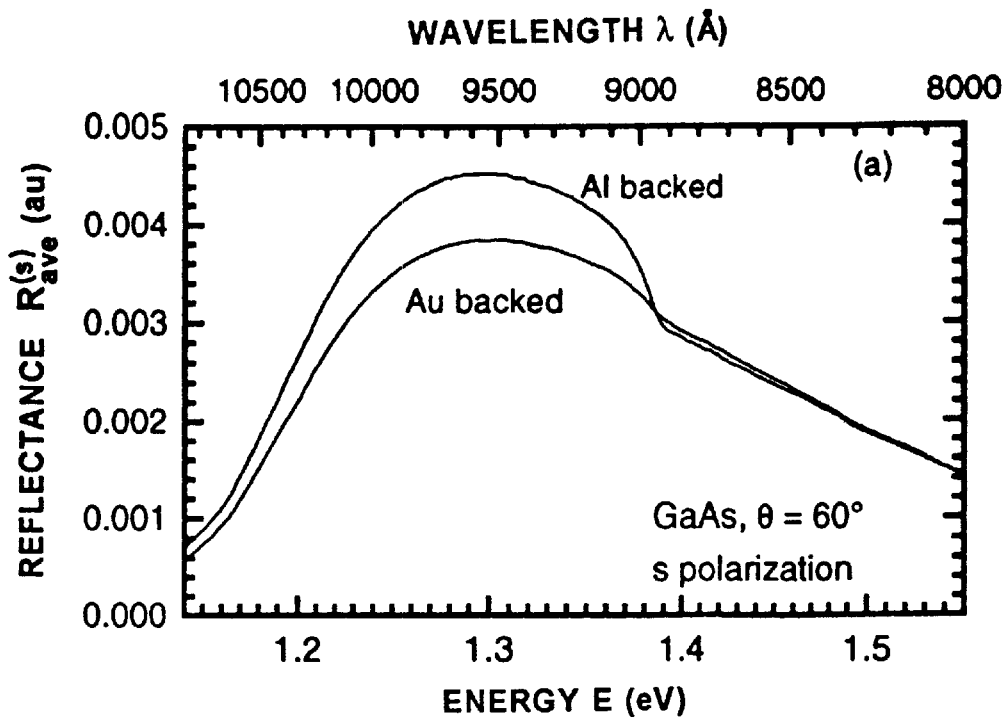
FIG. 16 is two graphs of typical experimental spectra for Au and Al backed GaAs samples at θ=60° and T=22° C. where (a) is s polarization and (b) is p polarization.
Figure 16B:
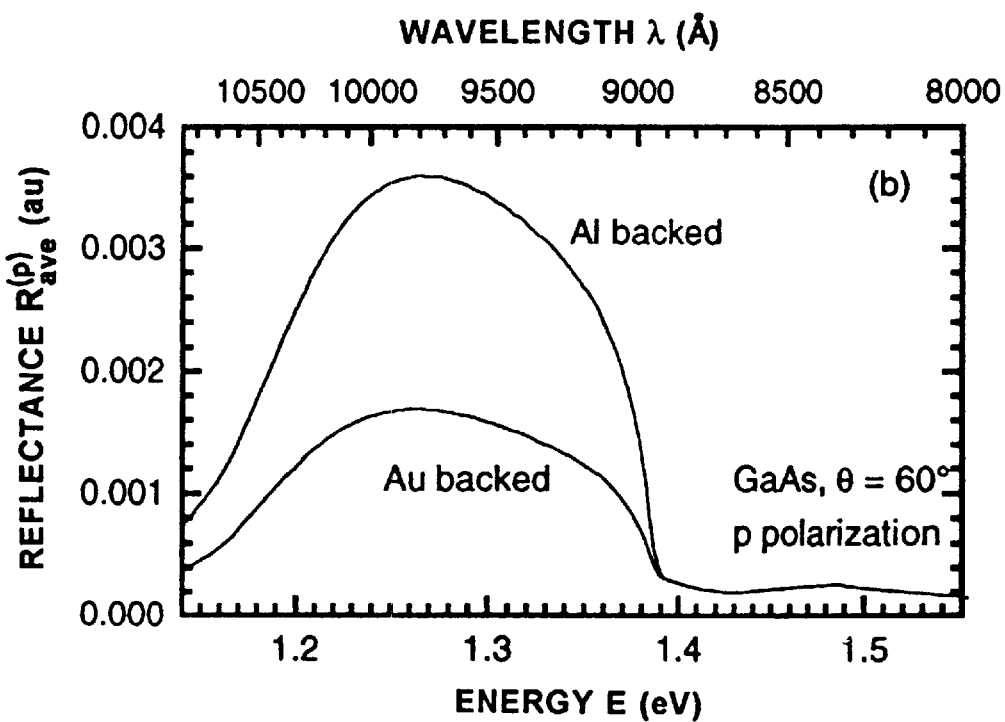
Figure 17A:
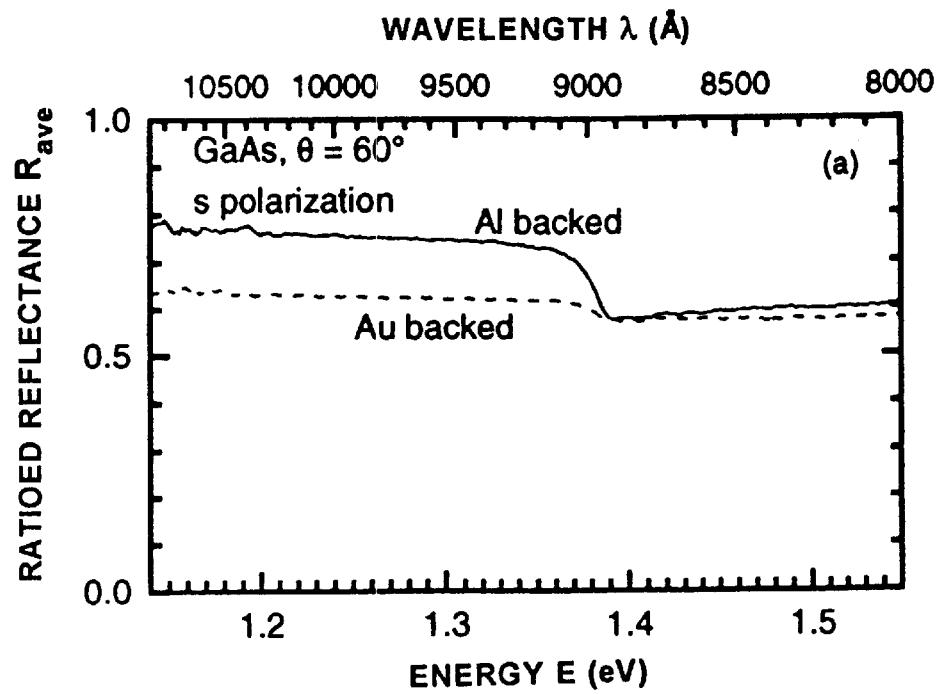
FIG. 17 is two graphs of ratioed experimental spectra. The spectra of FIG. 16 have been divided by their corresponding spectra from FIG. 15.
Figure 17B:
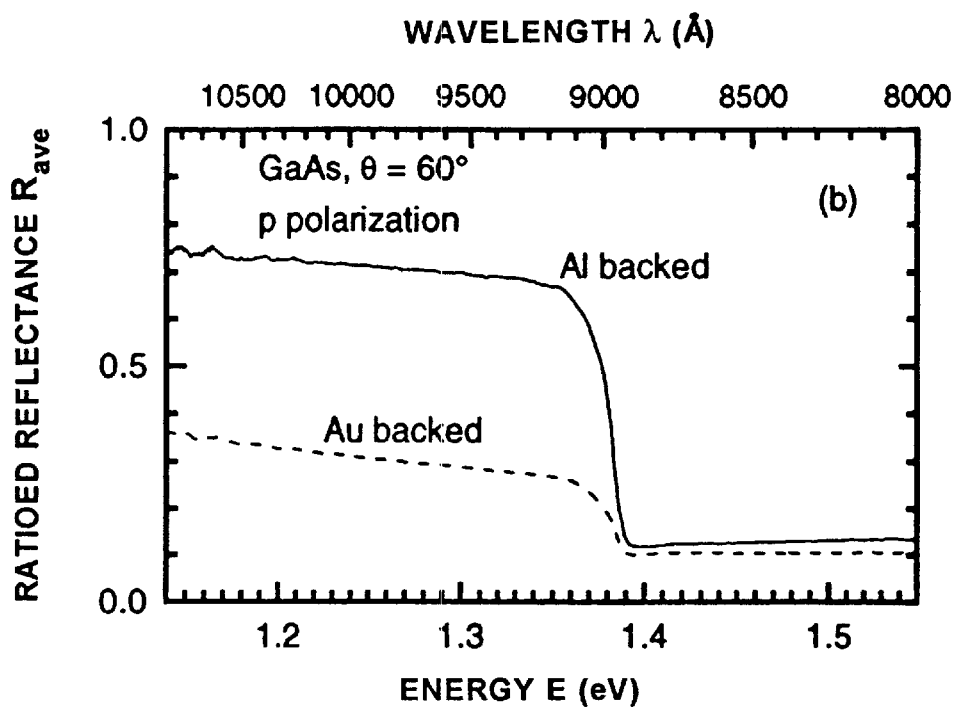

FIG. 16 shows reflection spectra from 635-μm thick, semi-insulating GaAs samples for θ=60°. The back side of one of the samples was coated with Al and the other was coated with Au. To eliminate the effects of the instrumental response, sample spectra are divided by background spectra. FIG. 17 presents the sample spectra of FIG. 16 divided by the background spectra of FIG. 15. Note that in FIG. 17 the Au-backed spectra have a much lower intensity than the Al-backed spectra. This is contrary to what one would expect from FIG. 6 which shows that the theoretical GaAs-Au interface reflectance is larger than that of the GaAs-Al interface. It is possible that the GaAs-Au interface of the sample was rough, leading to a scattering loss.

Figure 18A:
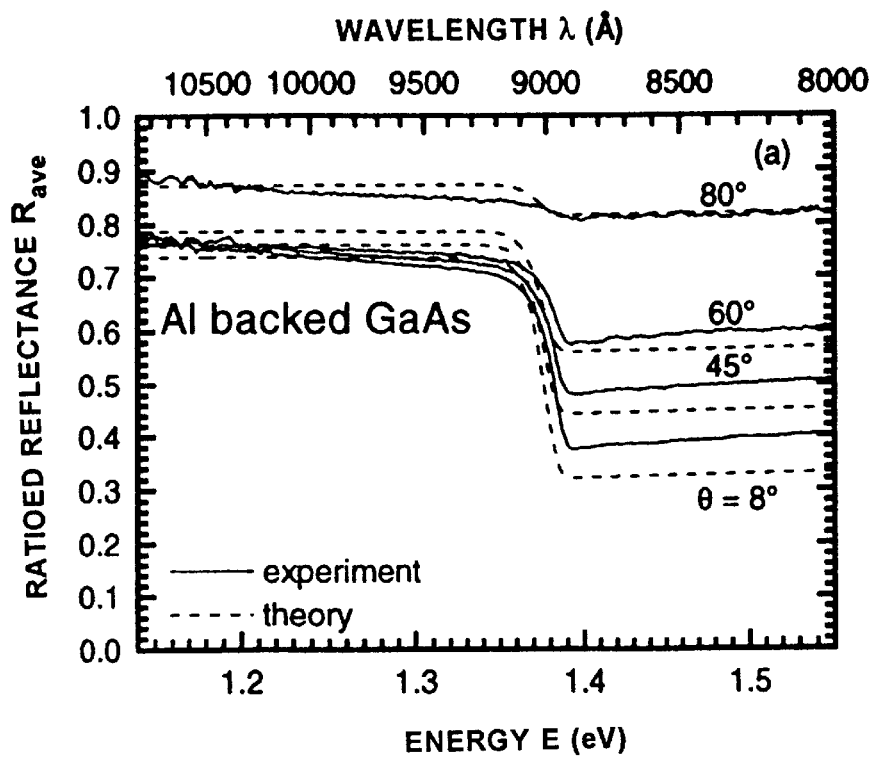
FIG. 18 is two graphs of ratioed experimental (solid line) and calculated (dashed line) spectra for an Al backed GaAs sample at T=22° C. for four values of θ where (a) is s polarization and (b) is p polarization.
Figure 18B:
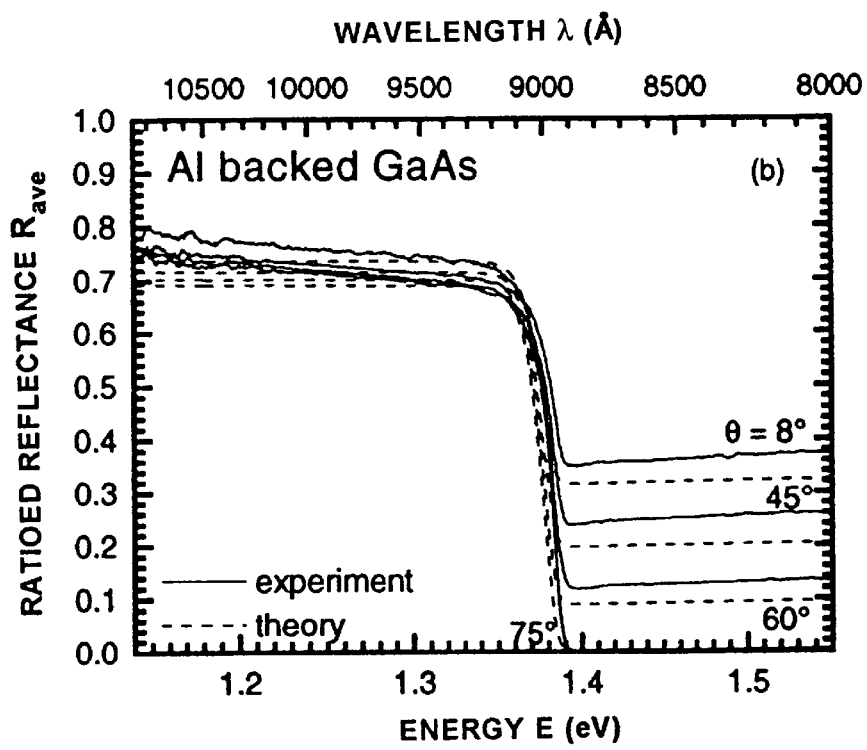

FIG. 18 shows the ratioed s- and p-polarized reflectance (solid lines) from the Al backed sample for several values of $\theta$ at T=22° C. The theoretical reflectances (dashed lines) calculated from Eq. (1) are also shown. The experimental spectra agree well with the theoretical spectra.

Figure 19A:
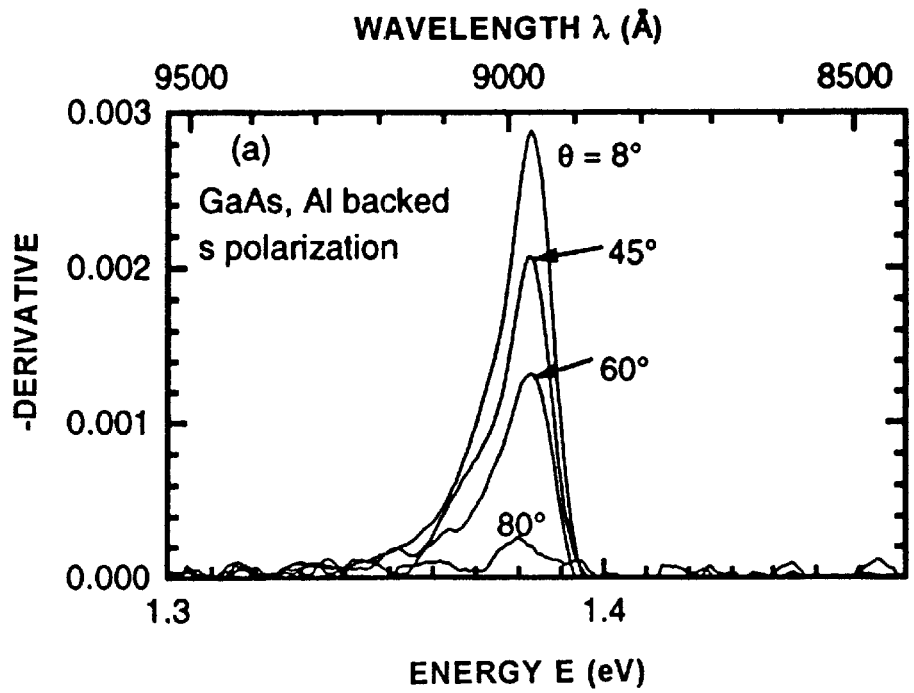
FIG. 19 is two graphs of numerical derivatives of the experimental spectra in FIG. 18 where (a) is s polarization and (b) is p polarization.
Figure 19B:
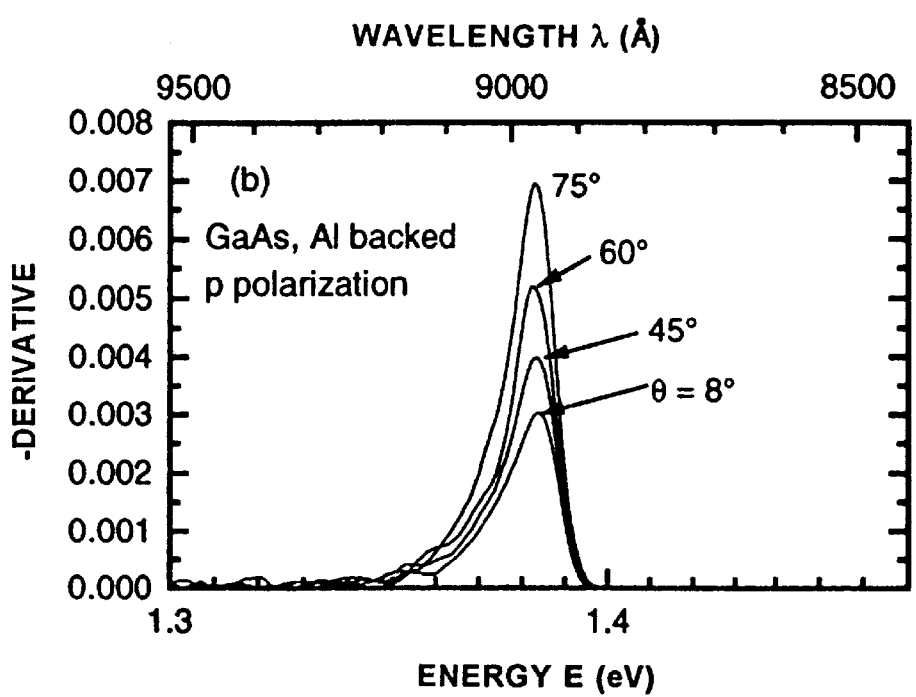

The first derivatives (inverted) of the spectra in FIG. 18 are presented in FIG. 19. The curves are 13-point numerical derivatives calculated with the Savitzky-Golay algorithm. The peak positions are located at ~8963 Å. The derivative of $R_{ave}^{(p)}$ for $\theta=75°$ is also presented in FIG. 13 by the dashed line. The experimental peak position is in good agreement with that calculated from the absorption coefficient obtained from the transmission spectrum.

As previously mentioned, most monochromators scan linearly in wavelength and the reflection spectrum is recorded as a function of wavelength. Monochromators have a stepping motor that turns the grating. When the grating turns the wavelength changes. Each time the stepping motor moves (steps), the wavelength is changed by the same amount over the entire wavelength range. Since the energy is inversely proportional to the wavelength, the energy change for each step varies over the wavelength range. Thus when calculating the derivative of a experimental spectrum to compare with the theoretical curve as in FIG. 18, one must use $$\frac{dR}{dE} = \frac{12398}{E^2} \frac{dR}{d\lambda}. \tag{15}$$

There are many variations of the optical setup depicted in FIG. 14. For example, the monochromator can be positioned after the sample. This is particularly advantageous when the temperature of a sample in a plasma etcher is monitored. The grating acts as a filter and eliminates most of the plasma light. In addition, fiber optics can be used to direct the light beams. A multichannel detector can be used to reduce the data acquisition time.

It is understood that the foregoing detailed description is given merely by way of illustration and that many variations may be made therein without departing from the spirit of this invention.

What is claimed is:

1. A method for determining the temperature of a sample comprising
   a) measuring the specular reflectance from the sample at an oblique angle of incidence;
   b) locating a significant marker on the absorption edge; and
   c) matching the position of the marker with a calibration curve so as to determine the temperature.

2. A method according to claim 1, wherein the specular reflectance is obtained by shining broadband light onto the sample.

3. A method according to claim 2, wherein a monochromator is positioned after the sample.

4. A method according to claim 2, wherein a monochromator is positioned before the sample.

5. A method according to claim 1, wherein the significant marker is an inflection point on an absorption edge or a high-energy knee.

6. A method according to claim 1, wherein the sample is a semiconductor.

7. A method according to claim 1, wherein the angle of reflectance equals the angle of incidence.

8. A method according to claim 1, wherein the calibration is conducted by placing the sample in in an isothermal oven.

9. A method according to claim 1, wherein fiber optics are used to direct the light beams.

10. A method according to claim 1, wherein a multichannel detector is used to reduce the data acquisition time.

11. A method for determining the temperature of a sample comprising the steps of:
    a) directing light from a broadband source to a sample at an oblique angle of incidence, said light source having an energy range which straddles the sample's bandgap energy;
    b) detecting at a detector the specularly reflected light and recording the reflectance spectrum by measuring the specularly reflected light as a function of the wavelength over a wavelength range that encompasses the bandgap; and
    c) determining the temperature by matching a significant marker from the reflection spectrum to a calibration curve.

12. A method according to claim 11, wherein then the light traveling from the broadband source to the detector passes through a monochromator having an entrance slit and an exit slit, a polarizer which passes either s or p polarized light and a filter which blocks second order light from the monochromator.

13. A method according to claim 11, wherein the light is focused by a lens into the entrance slit of the monochromator and the light from the exit slit of the monochromator is further focused by a second lens.

14. A method according to claim 11, wherein the significant marker in step (c) from the reflection spectrum is the inflection point of the absorption edge which is obtained by taking the first derivative of the reflection spectrum and locating the position of the first derivative peak, which is the location of the inflection point.

15. A method according to claim 14, wherein the location of this inflection point is matched on a calibration curve to determine the temperature.

16. A method according to claim 11, wherein the significant marker in step (c) from the reflection spectrum is the position of the knee at the high-energy end of the absorption edge which is obtained by finding the intersection of two asymptotic lines where one line is a linear extrapolation from the high energy plateau of the spectrum and the other line is a linear extrapolation through the steepest section of the absorption edge.

17. A method according to claim 16, wherein the location of knee point is matched on a calibration curve to determine the temperature.

18. A method according to claim 11, wherein the light is directed to the sample at Brewster's angle $\theta_B$, which is given by $\tan(\theta_B)=n_2/n_1$, where $n_2$ is the refractive index of the sample and $n_1$ is the refractive index of the incident medium, nominally air.

19. A method according to claim 18, wherein the light is p-polarized at the detector.

20. An apparatus for determining the temperature of a sample comprising:

a) light directing means for directing light from a broadband source to a sample having a backside coated with a metalic layer at an oblique angle of incidence which causes specularly reflected light to reflect off from the sample, said light source having an energy range which straddles the sample's bandgap energy;

b) recording means for recording reflectance spectrum by measuring the specularly reflected light as a function of a wavelength over a wavelength range that encompasses the bandgap; and c) temperature determining means for determining the temperature by matching a significant marker from the reflectance spectrum to a calibration curve.

21. An apparatus according to claim 20, wherein the light directing means comprises in the light path a monochromator having an entrance slit and an exit slit, a lens for focusing the light into the entrance slit of the monochromator and a lens for focusing the light from the exit slit of the monochromator, a polarizer which passes either s or p polarized light and a filter which blocks second order light from the monochromator.

22. An apparatus according to claim 21, wherein the light directing means further comprises a quartz halogen lamp and means for chopping the light.

23. An apparatus according to claim 21, wherein the monochromator is positioned between the light source and the sample.

24. An apparatus according to claim 21, wherein the monochromator is positioned between the sample and the recording means.

25. An apparatus according to claim 21, wherein the recording means comprises a detector and a lens to focus the specularly reflected light into the detector.

26. An apparatus according to claim 20, wherein the recording means further comprises a multichannel detector.

27. An apparatus according to claim 20, further comprising fiber optics to direct the light to and from the sample.

28. An apparatus according to claim 20, wherein the light directing means directs the light to the sample at Brewster's angle $\theta_B$, which is given by $\tan(\theta_B)=n_2/n_1$, where $n_2$ is the refractive index of the sample and $n_1$ is the refractive index of the incident medium, nominally air.

* * * * *